US010178697B2

(12) United States Patent
Pajovic et al.

(10) Patent No.: US 10,178,697 B2
(45) Date of Patent: *Jan. 8, 2019

(54) SYSTEMS AND METHODS FOR SEPARATING COLLIDED PACKETS IN SHARED WIRELESS CHANNELS

(71) Applicant: Mitsubishi Electric Research Laboratories, Inc., Cambridge, MA (US)

(72) Inventors: Milutin Pajovic, Cambridge, MA (US); Philip Orlik, Cambridge, MA (US)

(73) Assignee: Mitsubishi Electric Research Laboratories, Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/472,608

(22) Filed: Mar. 29, 2017

(65) Prior Publication Data

US 2018/0242361 A1   Aug. 23, 2018

Related U.S. Application Data

(60) Provisional application No. 62/462,123, filed on Feb. 22, 2017.

(51) Int. Cl.
*H04W 74/08* (2009.01)
*H04W 56/00* (2009.01)
(Continued)

(52) U.S. Cl.
CPC ......... *H04W 74/0816* (2013.01); *H04L 1/005* (2013.01); *H04L 25/0204* (2013.01); *H04W 56/001* (2013.01); *H04W 74/0841* (2013.01)

(58) Field of Classification Search
CPC .......... H04W 74/0816; H04W 56/001; H04W 74/0841
See application file for complete search history.

(56) References Cited

U.S. PATENT DOCUMENTS 5,657,326 A   8/1997   Burns et al.
5,940,400 A   8/1999   Eastmond et al.
(Continued)

OTHER PUBLICATIONS

Xiao Li et al. Compressive Link Acquisition in Multiuser Communications, IEEE Transactions on Signal Processing, vol. 61, No. 12, Jun. 1, 2013. pp. 3229-3245.
(Continued)

*Primary Examiner* — Feben Haile
(74) *Attorney, Agent, or Firm* — Gene Vinokur; James McAleenan; Hironori Tsukamoto

(57) ABSTRACT

Systems and methods for a receiver decoding a set of packets asynchronously transmitted using a nominal carrier frequency over a common communication medium. A set of antennas to receive the packets asynchronously transmitted over the common communication medium. A front end to produce a received signal, wherein each packet includes a preamble common for all packets and a payload unique for some packets. A channel estimator performs a sparse recovery in a three dimensional search domain defined by three axes including a frequency offset, a time offset and an angle of arrival, as well as estimates a channel gain corresponding to the transmission of each packet over a channel in the common communication medium. Finally, a decoder in communication with the processor, to decode the payloads of the packets in the set of packets using the frequency offsets, the time offsets, the angles of arrival and the channel gains.

18 Claims, 20 Drawing Sheets

(51) Int. Cl.
*H04L 1/00* (2006.01)
*H04L 25/02* (2006.01)

(56) References Cited

U.S. PATENT DOCUMENTS

| | | |
|---|---|---|
| 7,433,396 B2 | 10/2008 | Roy |
| 9,768,928 B1 * | 9/2017 | Yue .................... H04L 5/0048 |
| 2007/0206664 A1 | 9/2007 | Grant et al. |
| 2010/0215081 A1 | 8/2010 | Zaman et al. |
| 2015/0304125 A1 * | 10/2015 | Nee ......................... H04L 5/16 |
| | | 370/294 |

OTHER PUBLICATIONS

Xiao Li et al., "Compressive Link Acquisition in Multiuser Communications," IEEE Transactions on Signal Processing, IEEE Service Center, NY, NY, US. vol. 61, No. 12, Jun. 1, 2013. pp. 3229-3245.

Qiang Li et al., "Towards Collisions: An Enhanced Successive Interference Cancellation with Asynchronism," Global Communications Conference, 2012 IEEE, Dec. 3, 2012. pp. 5093-5098.

* cited by examiner

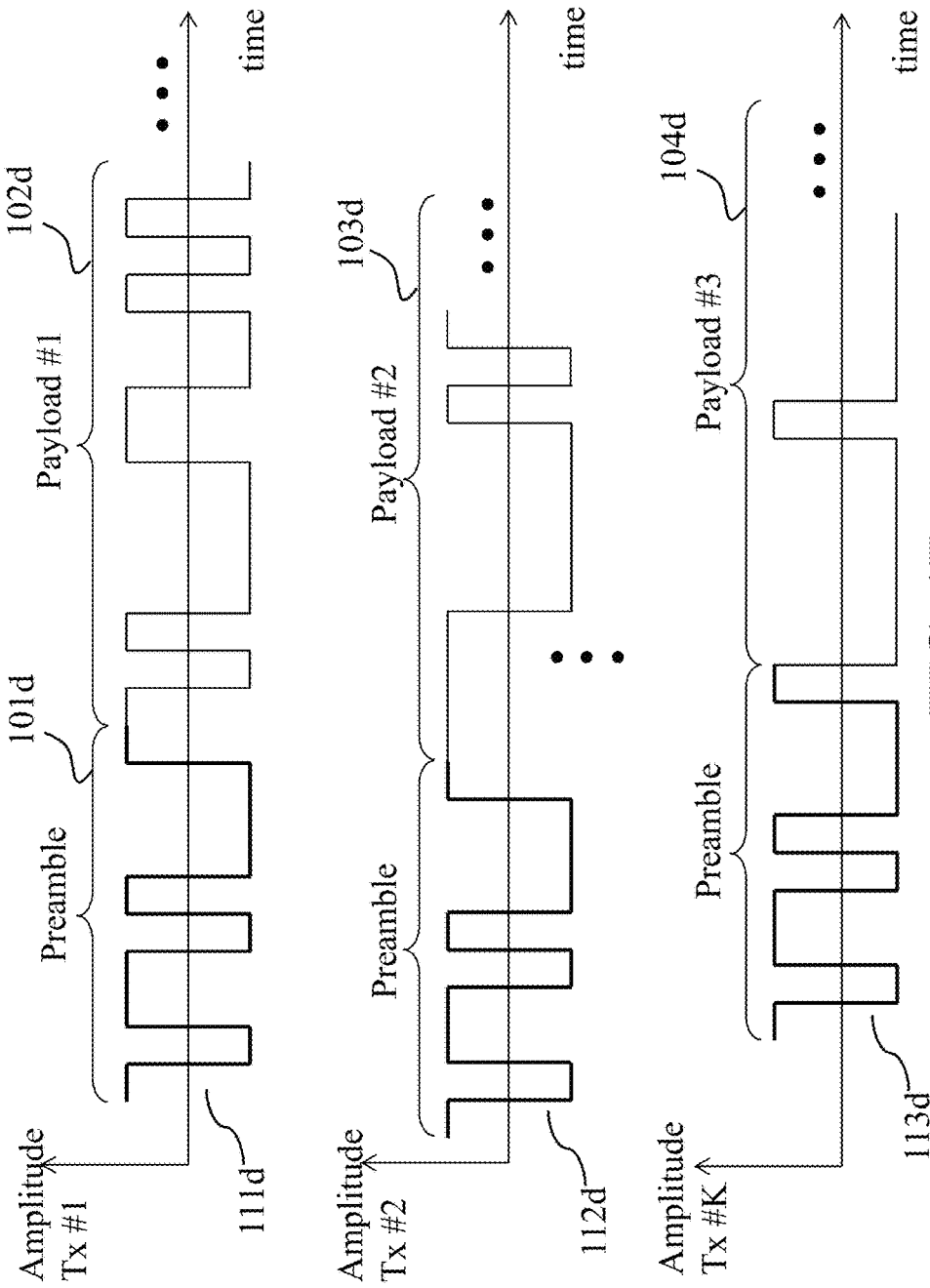

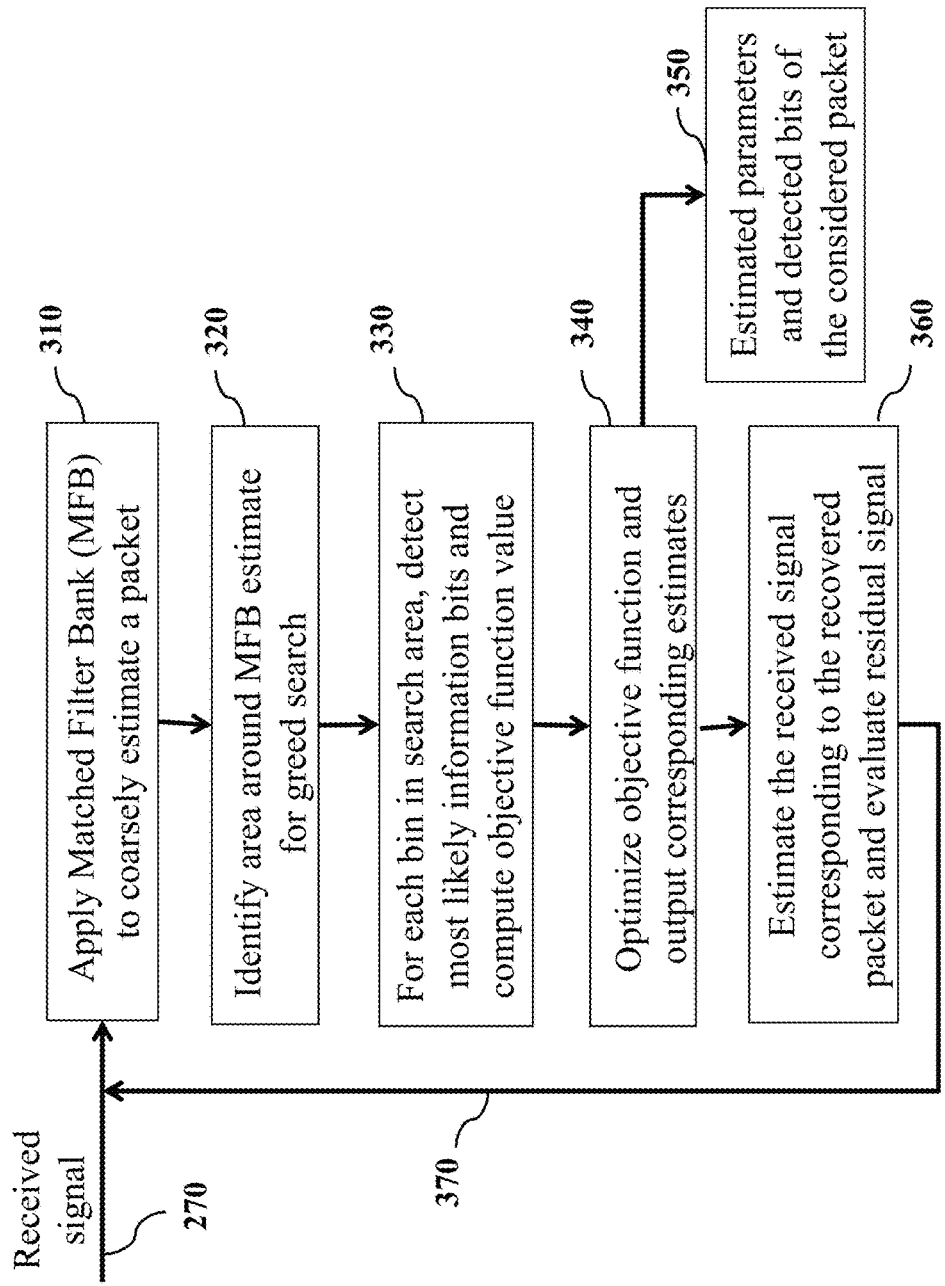

Require: Received signal $r(t)$
Initialize search space $S$ as in (4)
Initialize MFB as in (6)
Initialize residual signal $\tilde{r}_m(t) = r_m(t)$, $m = 1, \ldots, M$.
for $i = 1, 2, \ldots, K$ do
  Process $\tilde{r}_m(t)$ through MFB to obtain $y_{f,\alpha}(t)$ as in (7)
  Find coarse estimates $\hat{\tau}_0, \hat{f}_0$ and $\hat{\alpha}_0$ as in (8)
  Define search area $\mathcal{N}(\hat{\tau}_0, \hat{f}_0, \hat{\alpha}_0)$ as in (9)
  for $(\tau, f, \alpha) \in \mathcal{N}(\hat{\tau}_0, \hat{f}_0, \hat{\alpha}_0)$ do
    Extract received portion $r_{\tau,m}(t)$ as in (10)
    Beamform to obtain $\tilde{r}_{\tau,f,\alpha}(t)$ as in (11)
    Frequency compensate to obtain $\check{r}_{\tau,f,\alpha}(t)$ as in (12)
    Estimate $\theta_{\tau,f,\alpha}$ and $h_{\tau,f,\alpha}$, and detect $\hat{p}_{\tau,f,\alpha}$ from $\check{r}_{\tau,f,\alpha}(t)$ as outlined in Section 2.6
    Evaluate $z_{\tau,f}(t)$ as in (13)
    Evaluate objective function $J(\tau, f)$ as in (14)
  end for
  Find $\hat{\tau}^{(i)}, \hat{f}^{(i)} = \arg\max_{\tau,f} J(\tau, f)$
  Payload symbols $\hat{p}^{(i)} = \hat{p}_{\hat{\tau}^{(i)}, \hat{f}^{(i)}}$
  Evaluate $\hat{z}^{(i)}_{\hat{\tau},\hat{f},\hat{\alpha},m}(t)$ as in (23)
  Find residual $\tilde{r}_m(t)$ of the LS fit of $\hat{z}^{(1)}_{\hat{\tau},\hat{f},\hat{\alpha},m}(t), \ldots, \hat{z}^{(i)}_{\hat{\tau},\hat{f},\hat{\alpha},m}(t)$ in the received signal $r_m(t)$
end for
return Parameters and symbols of the collided packets

FIG. 9

SYSTEMS AND METHODS FOR SEPARATING COLLIDED PACKETS IN SHARED WIRELESS CHANNELS

FIELD

The present disclosure relates to methods and systems for communications systems and more particularly to packet collision detection for decoding asynchronously transmitted packets in multi-user communication systems.

BACKGROUND

Communications systems that employ a shared communications medium may, in certain circumstances, permit two or more users to transmit information at the same time. For example, a wireless receiver picks up a number of packets, asynchronously transmitted by different users/terminals. The receiver contains multiple antennas. The packets have random relative delays and their signals are offset in frequency due to oscillator imperfections and Dopper. In addition, each transmitted signal is exposed to phase noise also due to oscillator imperfections. A packet consists of preamble, which is known and same for all packets, and payload, which contains information symbols.

These asynchronous transmissions can cause multiple transmitted packets to overlap in time upon arrival at a designated receiver, which gives rise to packet collision. At the receiver, such overlapping transmissions combine to form a composite signal. When a collision occurs, the multiple transmissions interfere with each other in a manner that can prevent the reception of a portion or all of the information in these transmissions.

Recovery from a collision requires the retransmission of information by users. Unfortunately, as collision probability increases, so does the expected number of the retransmissions. If the number of retransmissions becomes excessive, latencies associated with the transfer of information increase and communications capacity is wasted.

To reduce the amount of wasted capacity, many communications systems are able to adjust their parameters to optimize performance. For example, certain TDMA systems are able to dynamically adjust the number of allocated contention time slots to keep collision rates, often measured in collisions per second, within an acceptable range.

Thus, to effectively control collision rates, a communications system needs to accurately detect collisions. Conventional collision detection techniques do not provide great accuracy. For example, one such technique detects collisions based solely on received signal power. According to this technique, a collision is detected when one or more power measurements are above a certain level.

This power-based technique disadvantageously assumes that all signals have the same power and detect collision by detecting jumps in the power of the received signal. However, normal transmit power variations, as well as gains of different channels that different packets are transmitted over, may corrupt such collision detection process. In addition, frequency offsets between two or more colliding signals can result in a combined signal that does not have an increased power level within the observation window, thereby leading to an inaccurate estimates of the time instant at which collision occurs. Finally, the power based technique fails to detect a substantial number of collisions in a way that such failures result in collision rate overestimation or underestimation, which leads to ineffective contention slot allocation decisions.

Traditionally, a packet collision problem is addressed by forcing the communication system to avoid packet collisions. In short, if collision has been detected, the terminals are forced to back off certain time from transmission and one of the terminals would get the resource and retransmit its packet.

However, these conventional mechanisms for collision avoidance schemes suffer from latency and overall system capacity reduction. Latency results from forcing the terminals to back off and retransmit packets after a certain time period. Capacity reduction is caused by not using the channel resources optimally. Additionally, collision avoidance mechanisms are embedded into MAC and network layer of the protocol stack, which also contributes to latency and capacity reduction.

Accordingly, there is a need for systems and methods to determine the collision in the presence of frequency offsets, timing offsets and an angle of arrival, as well as estimates a channel gain corresponding to the transmission of each packet over a channel in the common communication medium.

SUMMARY

Embodiments of the present disclosure relate to systems and methods to communications systems, and more particularly, to packet collision detection for decoding asynchronously transmitted packets in multi-user communication systems.

In particular, the present disclosure addresses the problem of how to detect the number of colliding packets, estimate their parameters (phase noise, angles of arrival, relative delays, frequency offsets, channel tap coefficients) and extract their information symbols. While experimenting to solve this problem, we addressed the traditional construct of multi-user systems built-in channel access mechanisms, which are conventionally aimed at reducing the likelihood of collisions between packets sent by different users. However, we discovered that these types of built-in channel access mechanisms are highly critical to latency, and thus did not consider these types of design choice(s).

Through the course of solving this problem, we learned one of our goals needs to include how to separate collided packets, sent by different users, and detect their bits on the receiver side. We understood that to aid packet separation, each packet consists of a common preamble, known in advance, while the information bits are contained in the packet payload. So, we wanted to design a packet separation method to work concurrently with the random access mechanism and separate packets, when the random access mechanism fails to prevent collision. Going beyond that, a random access mechanism may grant transmission to a latency critical packet and, in case of a collision with some other packet, leave our packet separation algorithm to separate the packets.

We further realized that in order to separate collided packets, our systems and methods should include certain conditions. For example, the first condition includes that users transmit packets asynchronously, and thus is very likely that packets have non-zero relative delays.

The second condition is that an oscillator, which is part of any transmitter, is imperfect and gives rise to a random frequency offset such that it is very likely that two packets have different frequency offsets. In particular, packets transmitted over a shared communication medium have, in general, different relative time offsets and exhibit different frequency offsets due to clock imperfections and/or relative motion between the transmitters and the receiver. If those frequency and time offsets are known, the collided packets can, in general, be decoded. However, there are quite a number of different combinations of time-frequency offsets. In such a manner, a disadvantage of the unpredictability of the frequency and time offsets can be turned into an advantageous knowledge that collided packets can be separated based on different frequency and time offsets, and in turn, decoded. Further, there can be tens of thousands of different combinations of the time-frequency offsets and only ten concurrently transmitted packets. To that end, we addressed the problem of determining the combinations of the time and frequency offsets of the transmitted packets as a type of recovery problem, where each atom of the recovery encodes time offset, frequency offset and indirectly payload symbols.

The third condition, and most importantly, we further realized when a receiver has multiple antennas, an angle-of-arrival (AoA) domain can be also used for packet separation and spatial filtering of interference. Specifically, users see the receiver at different angles, such that signals originating from different users have different angels of arrival (AoA). The search domain is then three-dimensional with three axes: delay, frequency offset and angle of arrival. Even if two packets have the same two out of those three parameters, it is highly unlikely that the remaining parameter will be the same.

In contrast to using a single antenna, our systems and methods have multiple antennas on the receiver side that not only provide an additional degree of freedom, in addition to delay and frequency offset, but also provide an opportunity for spatial filtering. Namely, upon locating a packet in the delay-frequency offset-angle of arrival domain, our methods apply spatial filtering, i.e. beamforming, to reject signals arriving from all directions other than the arriving direction of the considered packet. We consider that as essential in achieving an acceptable bit detection performance.

However, we quickly learned implementing multiple antennas into practice within the confines of a packet separation method, turned-out to be more of a challenge than we thought. Initially, we expected that employing multiple antennas on the receiver should lead to an improved packet separation and bit detection performance. But, this was not the case, we first tried using a processor for each antenna, which we later dismissed based upon a further realization.

We realized, if certain requirements/conditions related to communication system parameters and radio wave propagation are satisfied, then the multiple antennas on the receiver can be utilized in a far more advantageous way, wherein they form a phased array. Specifically, the multiple antennas on the receiver behave as a phased array implies the notion of an angle of arrival (AoA) of a radio wave impinging upon the array. Namely, an angle of arrival is associated with each (approximately) plane wave impinging upon the antenna array and carrying a packet. Therefore, in addition to time offset and frequency offset, each packet is also characterized with its own angle of arrival. We emphasize that the notion of AoA is only possible under two requirements. Otherwise, AoA cannot be defined.

The first requirement regarding the notion of AoA of the third condition, stems from the requirement that the samples of the signals received across the array within a relatively small time interval correspond to the same signaling interval. This condition translates to the requirement that the sampling period (the time duration between two consecutive signal samples) be much larger than the maximum propagation time of the incoming wave across the antenna array.

The second requirement regarding the notion of AoA of the third condition, is that the radio waves received on the antenna array resemble plane waves. This occurs when the distance between the source and antenna array (i.e., receiver) is large relative to the antenna array size. Intuitively, that means that the wavefront of spherical wave radiated from a point source looks like the wavefront of a plane wave at the antenna array.

We also realized that in order to separate collided packets, our systems and methods need to consider phase noise, i.e., rapid, short-term, random fluctuations in the phase of a waveform. For example, clocks and oscillators in communication systems in both transmitters and receivers, give rise to a considerable amount of carrier phase noise. This leads to significant performance degradation, if the phase noise is not estimated and properly compensated. In addition, an uncompensated phase noise may even cause a complete failure of the communication link between the transmitter and receiver.

Specifically, in our packet separation problem we are trying to solve, the effects of uncompensated phase noise can have a more detrimental impact on the overall performance, among other things. Namely, because the traditional construct of packet separation algorithms will treat a certain amount of phase noise as an additional frequency offset, which, in turn, leads to wrong estimates of frequency offsets. Moreover, phase noise corresponding to one packet may "leak" and be treated as an additional frequency offset corresponding to some other packet, leading to wrong frequency offset estimate of that other packet. Which all, in turn, leads to performance degradation.

We solve for the uncompensated phase noise effects by performing a sparse recovery without considering the phase noise. Otherwise the search space would be prohibitively large. However, we consider the phase noise in the separation of the found packet transmissions in the received signal. In other words, the phase noise is indirectly incorporated in the sparse recovery by estimating most likely payload symbols for each triplet of the time offset, frequency offset and angle of arrival. We point out that finding the most likely payload symbols is done in conjunction with estimating the phase noise. That is, for a given triplet of the time offset, frequency offset and angle of arrival, the phase noise is, depending of the employed modulation format, either (1) jointly estimated with payload symbols, or (2) estimated and compensated, and then the most likely payload symbols are detected. Thus, effectively each column in the dictionary matrix indirectly incorporates the information about the phase noise.

The contribution of the recovered packet is removed from the received (residual) signal and the resulting signal is fed back for the following iteration. In doing so, the contribution of the recovered packet in the overall received signal is computed. We point out that the estimated phase noise corresponding to the recovered packet is directly incorporated in this computation. Otherwise, the computed contribution of the recovered packet in the received signal would be wrong and the packet recovery in the upcoming iterations would lead to completely wrong estimates of the parameters and symbols of the collided packets.

The present disclosure can be implemented, by non-limiting example, using receiver in communication with a processor and a memory, for decoding a set of packets asynchronously transmitted using a nominal carrier frequency over a common communication medium. Initially, the beginning step includes receiving the set of packets asynchronously transmitted over the common communication medium via a set of antennas. The next step can include producing a received signal, via a front end, that includes a combination of the set of packets modified with noise in the common communication medium. Wherein, each packet includes a preamble common for all packets in the set of packets and a payload unique for at least some packets in the set of packets. The next step can include using a channel estimator that can perform a sparse recovery in a three dimensional search domain defined by three axes including a frequency offset, a time offset and an angle of arrival, as well as estimates a channel gain corresponding to the transmission of each packet over a channel in the common communication medium. Finally, the step of using a decoder to decode the payloads of the packets in the set of packets using the frequency offsets, the time offsets, the angles of arrival and the channel gains.

According to an embodiment of the present disclosure, a receiver in communication with a processor and a memory for decoding a set of packets asynchronously transmitted using a nominal carrier frequency over a common communication medium. The receiver including a set of antennas to receive the set of packets asynchronously transmitted over the common communication medium. A front end to produce a received signal including a combination of the set of packets modified with noise in the common communication medium. Wherein each packet includes a preamble common for all packets in the set of packets and a payload unique for at least some packets in the set of packets. A channel estimator in communication with the processor, performs a sparse recovery in a three dimensional search domain defined by three axes including a frequency offset, a time offset and an angle of arrival, as well as estimates a channel gain corresponding to the transmission of each packet over a channel in the common communication medium. Finally, a decoder in communication with the processor, to decode the payloads of the packets in the set of packets using the frequency offsets, the time offsets, the angles of arrival and the channel gains.

According to an embodiment of the present disclosure, a method for decoding a set of packets asynchronously transmitted on a nominal carrier frequency over a common communication medium. The method including receiving the set of packets asynchronously transmitted over the common communication medium using a set of antennas. Using a front end to produce a received signal including a combination of the set of packets modified with noise in the common communication medium. Wherein each packet includes a preamble common for all packets in the set of packets and a payload unique for at least some packets in the set of packets. Determining, by a channel estimator in communication with a processor and a memory, using a sparse recovery, a frequency offset of the transmission of each packet from the carrier frequency, a time offset of the transmission of each packet from a common point in time, the angle of arrival of the transmission of each packet, as well as estimates a channel gain corresponding to the transmission of each packet over a channel in the common communication medium. Decoding, by a decoder, the payloads of the packets in the set of packets using the frequency offsets, the time offsets, the angles of arrival and the channel gains.

According to an embodiment of the present disclosure, a non-transitory computer readable storage medium embodied thereon a program executable by a computer for performing a method, the method for decoding a set of packets asynchronously transmitted on a nominal carrier frequency over a common communication medium. The method including receiving the set of packets asynchronously transmitted over the common communication medium using a set of antennas. Using a front end to produce a received signal including a combination of the set of packets modified with noise in the common communication medium. Wherein each packet includes a preamble common for all packets in the set of packets and a payload unique for at least some packets in the set of packets. Determining, by a channel estimator in communication with the computer, using a sparse recovery, a frequency offset of the transmission of each packet from the carrier frequency, a time offset of the transmission of each packet from a common point in time, the angle of arrival of the transmission of each packet, as well as estimates a channel gain corresponding to the transmission of each packet over a channel in the common communication medium. Finally, decoding, by a decoder in communication with the computer, the payloads of the packets in the set of packets using the frequency offsets, the time offsets, the angles of arrival and the channel gains.

Further features and advantages will become more readily apparent from the following detailed description when taken in conjunction with the accompanying drawings.

DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1F is a schematic illustrating aspects of the arrrival model including the packet structure of the users transmitting packets of FIG. 1D, according to embodiments of the present disclosure;

FIG. 3 is a block diagram of the outline of the processing, according to embodiments of the present disclosure;

FIG. 9 is a pseudo-code of one embodiment, according to embodiments of the present disclosure.

Figure 1A:
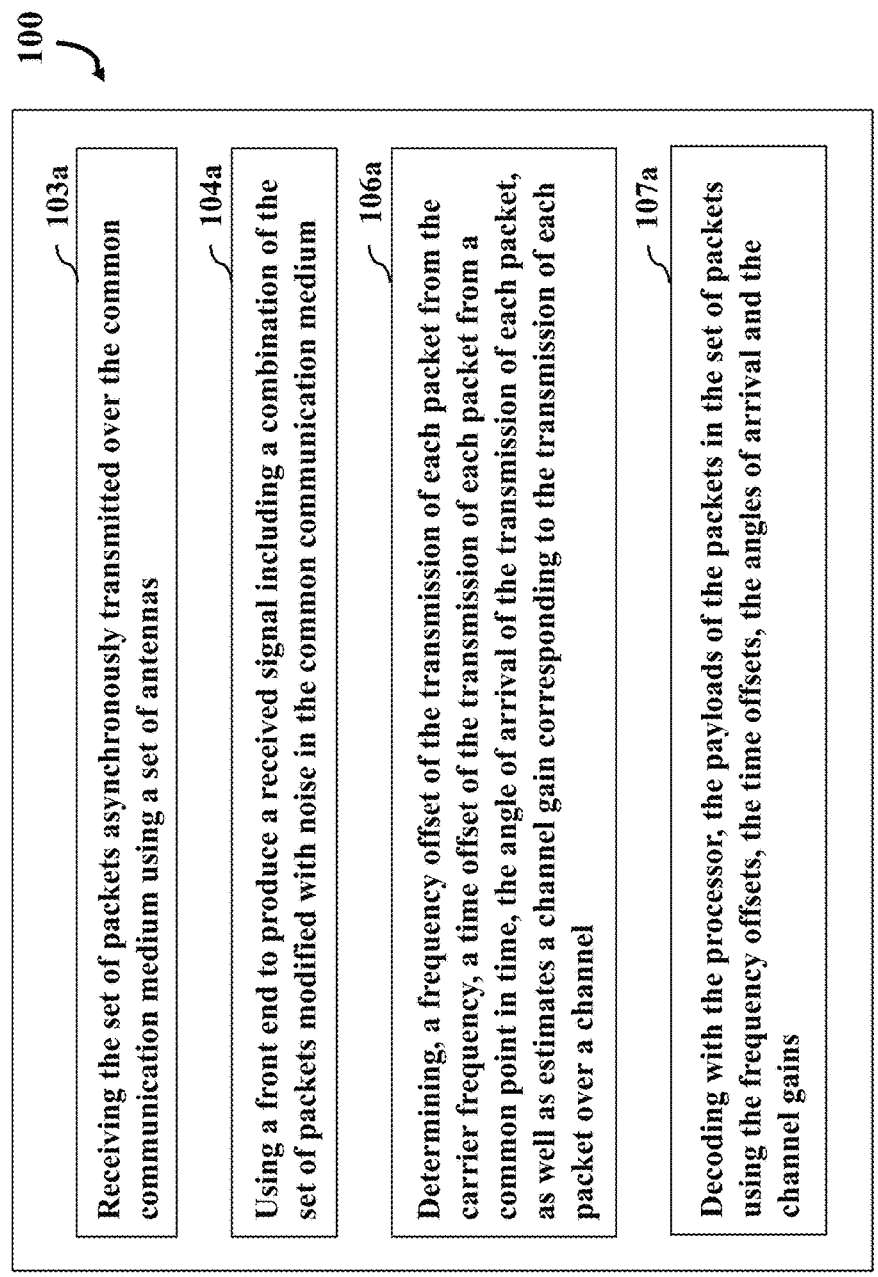
FIG. 1A is a flow diagram of a wireless communication system, according to an embodiment of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

Embodiments of the present disclosure relate to packet collision detection for decoding asynchronously transmitted packets in multi-user communication systems. In particular, the present disclosure addresses the problem of how to detect the number of colliding packets, estimate their parameters (angles of arrival, relative delays, frequency offsets, channel tap coefficients and phase noise) and extract their information symbols.

The present disclosure includes a receiver 114 in communication with a processor and a memory for decoding a set of packets asynchronously transmitted using a nominal carrier frequency over a common communication medium. The receiver including a set of antennas to receive the set of packets asynchronously transmitted over the common communication medium. A front end to produce a received signal including a combination of the set of packets modified with noise in the common communication medium. Wherein each packet includes a preamble common for all packets in the set of packets and a payload unique for at least some packets in the set of packets. A channel estimator in communication with the processor, performs a sparse recovery in a three dimensional search domain defined by three axes including a frequency offset, a time offset and an angle of arrival, as well as estimates a channel gain corresponding to the transmission of each packet over a channel in the common communication medium. Finally, a decoder in communication with the processor, to decode the payloads of the packets in the set of packets using the frequency offsets, the time offsets, the angles of arrival and the channel gains.

While solving this problem we learned one of our goals needs to include how to separate collided packets, sent by different users, and detect their bits on the receiver side. We understood that to aid packet separation, each packet consists of a common preamble, known in advance, while the information bits are contained in the packet payload. So, we designed a packet separation method that worked concurrently with the random access mechanism and separate packets, when the random access mechanism fails to prevent collision. Going beyond that, a random access mechanism may grant transmission to a latency critical packet and, in case of a collision with some other packet, leave our packet separation algorithm to separate the packets.

We further realized that in order to separate collided packets, our systems and methods should include certain conditions. For example, the first condition is that users transmit packets asynchronously, and thus is very likely that packets have non-zero relative delays.

The second condition is that an oscillator, which is part of any transmitter, is imperfect and gives rise to a random frequency offset such that it is very likely that two packets have different frequency offsets. In particular, packets transmitted over a shared communication medium have, in general, different relative time offsets and exhibit different frequency offsets due to clock imperfections and/or relative motion between the transmitters and the receiver. If those frequency and time offsets are known, the collided packets can, in general, be decoded. However, there are quite a number of different combinations of time-frequency offsets. In such a manner, a disadvantage of the unpredictability of the frequency and time offsets can be turned into an advantageous knowledge that collided packets can be separated based on different frequency and time offsets, and in turn, decoded. Further, there can be tens of thousands of different combinations of the time-frequency offsets and only ten concurrently transmitted packets. To that end, we addressed the problem of determining the combinations of the time and frequency offsets of the transmitted packets as a type of recovery problem, where each atom of the recovery encodes time offset, frequency offset and indirectly payload symbols.

The third condition, and most importantly, among other things, we further realized when a receiver has multiple antennas, an angle-of-arrival (AoA) domain can also be used for packet separation and spatial filtering of interference. Specifically, users see the receiver at different angles, such that signals originating from different users have different angels of arrival (AoA). The search domain is then three-dimensional with three axes: delay, frequency offset and angle of arrival. Even if two packets have the same two out of those three parameters, it is highly unlikely that the remaining parameter will be the same.

In contrast to using a single antenna, our systems and methods include multiple antennas on the receiver side that not only provide an additional degree of freedom, in addition to delay and frequency offset, but also provide an opportunity for spatial filtering. Namely, upon locating a packet in the delay-frequency offset-angle of arrival domain, our methods apply spatial filtering, i.e. beamforming, to reject signals arriving from all directions other than the arriving direction of the considered packet. Which we consider is essential in achieving an acceptable bit detection performance.

However, implementing multiple antennas into practice within the confines of a packet separation method, we discovered to turned-out to be more of a challenge than we thought. Initially, we expected that employing multiple antennas on the receiver should lead to an improved packet separation and bit detection performance. But, this was not the case, we first tried using a processor for each antenna, which we later dismissed based upon a further realization.

We realized, if certain requirements/conditions related to communication system parameters and radio wave propagation are satisfied, then the multiple antennas on the receiver can be utilized in a far more advantageous way, wherein they form a phased array. Specifically, the multiple antennas on the receiver behave as a phased array implies the notion of an angle of arrival (AoA) of a radio wave impinging upon the array. Namely, an angle of arrival is associated with each (approximately) plane wave impinging upon the antenna array and carrying a packet. Therefore, in addition to time offset and frequency offset, each packet is also characterized with its own angle of arrival. We emphasize that the notion of AoA is only possible under two requirements. Otherwise, AoA cannot be defined.

FIG. 1A is an embodiment of a method according to the present disclosure, the method is for a receiver in communication with a processor and a memory, for decoding a set of packets asynchronously transmitted using a nominal carrier frequency over a common communication medium. Initially, the beginning step 103a includes receiving the set of packets asynchronously transmitted over the common communication medium via a set of antennas. The next step 104a can include producing a received signal, via a front end, that includes a combination of the set of packets modified with noise in the common communication medium. Wherein, each packet includes a preamble common for all packets in the set of packets and a payload unique for at least some packets in the set of packets. The next step includes using a channel estimator 106a that can perform a sparse recovery in a three dimensional search domain defined by three axes including a frequency offset, a time offset and an angle of arrival, as well as estimates a channel gain corresponding to the transmission of each packet over a channel in the common communication medium. Finally, step 107a of using a decoder to decode the payloads of the packets in the set of packets using the frequency offsets, the time offsets, the angles of arrival and the channel gains.

Figure 1B:
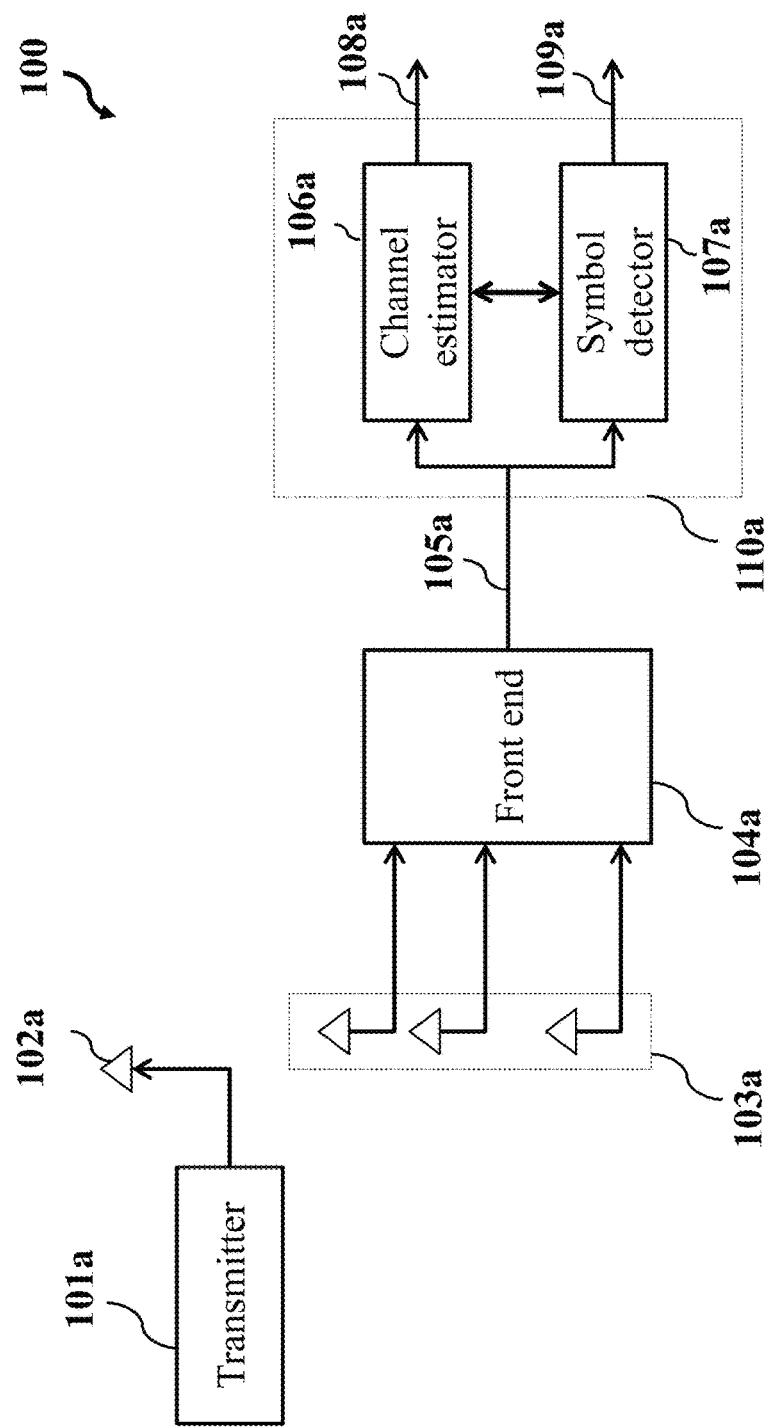
FIG. 1B is a schematic illustrating the wireless communication system components of FIG. 1A, according to an embodiment of the present disclosure.

FIG. 1B is a schematic illustrating the wireless communication system components of FIG. 1A, the transmitter 101a transmits a waveform carrying a message over an antenna 102a (single antenna or horn antenna or phase array antenna). The set of antennas 103a receives the message, wherein the front end 104a produces the received signal, that includes a combination of the set of packets modified with noise in the common communication medium. Wherein, each packet includes a preamble common for all packets in the set of packets and a payload unique for at least some packets in the set of packets. The generated received signal 105a is processed through a processor 110a implementing our packet separation method. The packet separation method consists, on a high level, of a channel estimator 106a, which estimates 108a the delays, frequency offsets, angles of arrivals, phase noise fluctuations and channel gains of all colliding packets, and a payload detector 107a, which detects 109a payload symbols/bits of all colliding packets.

Figure 1C:
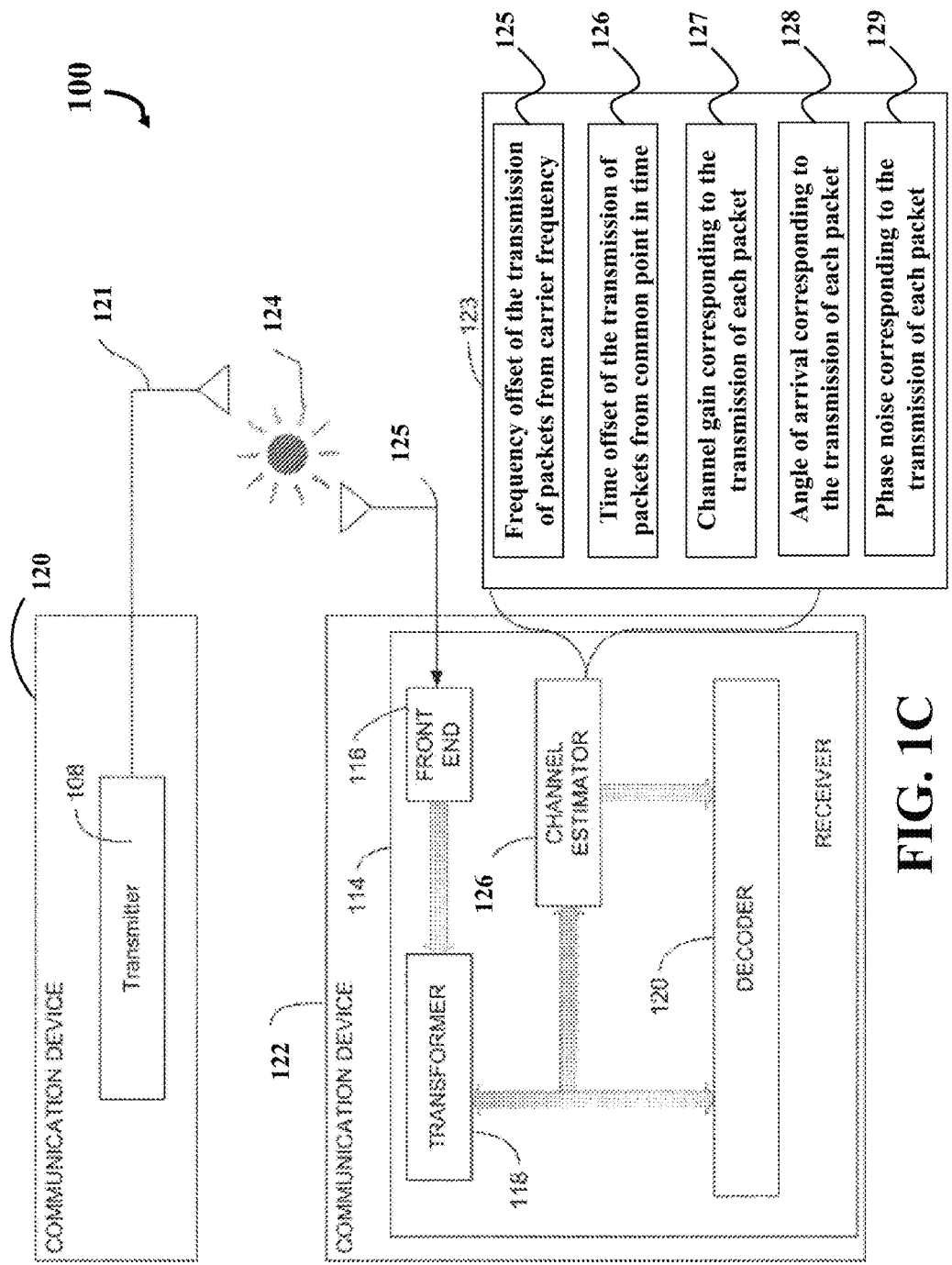
FIG. 1C is an exemplar transmission from multiple communication devices of FIG. 1B and method of FIG. 1A, according to embodiments of the present disclosure.

FIG. 1C is an exemplar transmission from multiple communication devices of FIG. 1B and method of FIG. 1A, according to embodiments of the present disclosure. Specifically, FIG. 1C shows a schematic of a wireless communication system 100 that includes at least one first communication device 120 able to communicate using some carrier frequency with a second communication device 122 over a common communication medium 124. The communication medium 124 can include any types of wireless channels suitable for concurrent communication among multiple communication devices. In this example, the receiving communication device 122 can be part of a base station in a cellular communication system, access point in a wireless local area network (WLAN), road-side unit (RSU) in a vehicle-to-infrastructure (V2I) communication system, etc. The transmitting communication devices can be part of mobile phone, smart phone, and communication system of moving vehicles.

Still referring to FIG. 1C, the transmitting device 120 has a transmitter 108 and an antenna 121, wherein a single data stream is transmitted over the communication medium 124 and received by receiving device 122 via antennas 125. Although the scope of the present disclosure is not limited in this respect, types of antennas used by various embodiments for antennas 121 and/or 125 include but are not limited to internal antenna, dipole antenna, omni-directional antenna, a monopole antenna, an end fed antenna, a circularly polarized antenna, a micro-strip antenna, a diversity antenna and the like.

Figure 1D:
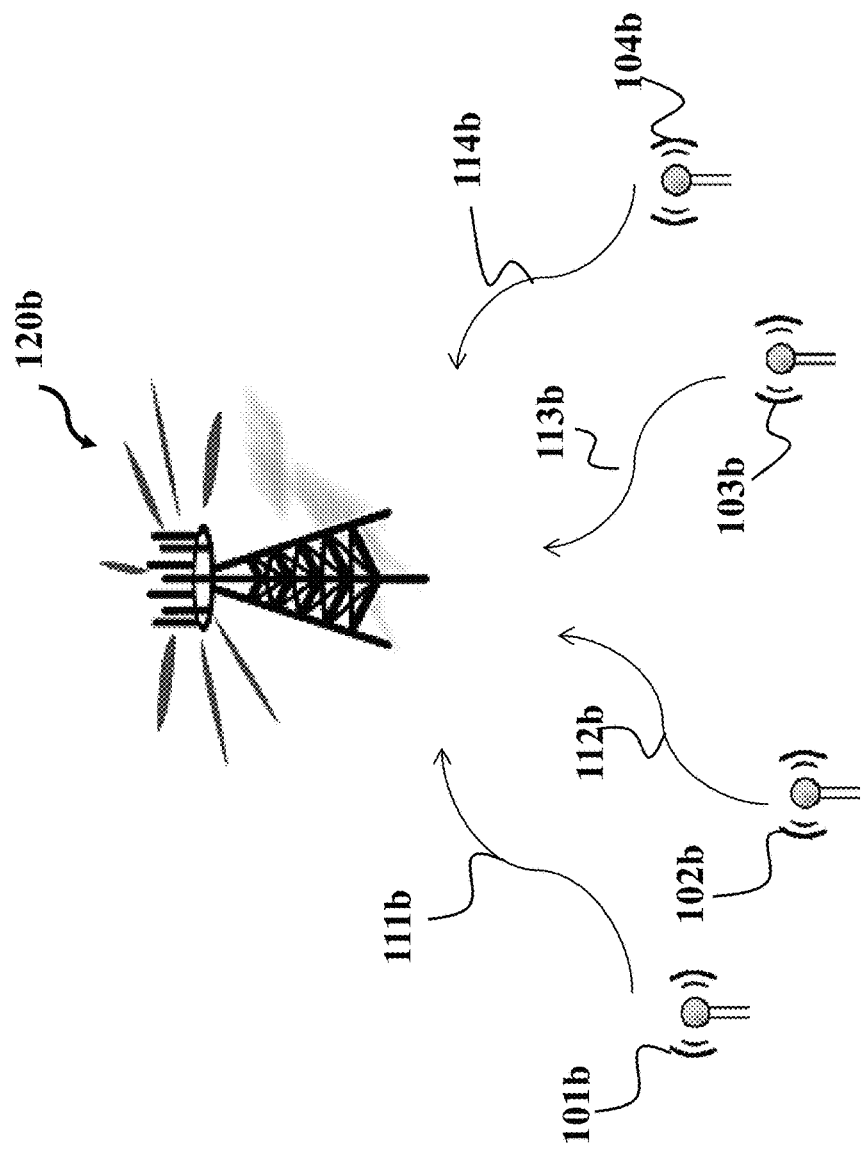
FIG. 1D is a schematic illustrating aspects of the arrrival model, according to embodiments of the present disclosure.

FIG. 1D is a schematic illustrating the arrrival model that are of aspects of FIGS. 1A, 1B and 1C, according to embodiments of the present disclosure. The arrival model will be further disclosed in detail below. FIG. 1D shows the scenario having K different users 101b, 102b, 103b, 104b, that transmit signals over respective channels 111b, 112b, 113b, 114b, to a receiver 120b employing M antennas.

Each transmission is performed within the communication medium 124 but according to different parameters of the transmission. Those parameters of transmission form different channels 111b, 112b, 113b, and 114d within the common communication medium 124. Examples of the parameters of transmission include time and frequency offsets, AoAs and channel gains.

Referring to FIGS. 1C and 1D, the communication devices, e.g., the device 120 and/or the devices 101b, 102b, 103b, and 104b of FIG. 1D, include a transmitter 108 (FIG. 1C) to transmit packets via antennas 121 (FIG. 1C), respectively. FIG. 1C shows the communication device 122 having a receiver 114 to receive the signal over the communication medium 124 via antenna 125. The received signal includes a combination of the set of packets asynchronously transmitted by the devices 101b, 102b, 103b, and 104b of FIG. 1D and modified with noise of the communication medium 124.

In some embodiments, the receiver 114 of FIG. 1C includes a front end 116 and/or a transformer 118. The front end 116 can include any suitable front end module to convert a time-domain signal received from antennas 125 into a time-domain signal of a format suitable for transformer 118. Transformer 118 may transform the signal into a plurality of different types of signals that are suitable for a decoder 120 or a channel estimator 126. For example, the frond end 116 can convert the received signal into a set of samples suitable for further processing and decoding.

It is noted that, the receiver includes the front end to produce a received signal including a combination of the set of packets modified with noise in the common communication medium, wherein each packet includes a preamble common for all packets in the set of packets and a payload unique for at least some packets in the set of packets, and wherein the channel estimator determines the frequency offset of the transmission of each packet from the nominal carrier frequency, the time offset of the transmission of each packet from a common point in time, the angle of arrival of the transmission of each packet, and the channel gain.

Still referring to FIG. 1C, the receiver 114 includes the channel estimator 126, that can include a processor 110b and a memory, to determine parameters of the transmission of the packets. For example, the processor is configured to determine: a frequency offset of the transmission of packets from carrier frequency 125; a time offset of the transmission of packets from common point in time 126; a channel gain corresponding to the transmission of each packet 127; an angle of arrival corresponding to the transmission of each packet 128; and phase noise corresponding to the transmission of each packet 129.

Further, the receiver 114 can also include a decoder 120 to decode the received signal using the parameters of transmission and to generate signal representing the packets.

As noted above, we realized, if certain requirements/conditions related to communication system parameters and radio wave propagation are satisfied, then the multiple antennas on the receiver can be utilized in a far more advantageous way, wherein they form a phased array. Specifically, the multiple antennas on the receiver behave as a phased array implies the notion of an angle of arrival (AoA) of a radio wave impinging upon the array. Namely, an angle of arrival is associated with each (approximately) plane wave impinging upon the antenna array and carrying a packet. Therefore, in addition to time offset and frequency offset, each packet is also characterized with its own angle of arrival. We emphasize that the notion of AoA is only possible under two requirements. Otherwise, AoA cannot be defined.

The first requirement regarding the notion of AoA of the third condition, stems from the requirement that the samples of the signals received across the array within some relatively small time interval correspond to the same signaling interval. This condition translates to the requirement that the sampling period (the time duration between two consecutive signal samples) be much larger than the maximum propagation time of the incoming wave across the antenna array. Specifically, we assume that the receiver employs N antennas arranged in a vertical line array with inter-antenna spacing d. Denoting with c the speed of electro-magnetic propagation in the environment, the maximum propagation time of the incoming wave is attained when the wave arrives from the array endfire and is given by $$T_{max} = \frac{d(N-1)}{c}$$

Assuming the inter-antenna separation d=λ/2 (which is often the case so that Nyquist condition for spatial sampling is met), where λ is the wavelength of the propagating waves, the maximum propagation time becomes $$T_{max} = \frac{(N-1)}{2f_c}$$

where $f_c$ is the carrier frequency and we used the relation $\lambda = c/f_c$.

On the other hand, denoting with $T_s$ the signaling time, $N_s$ the oversampling ratio and B the bandwidth, the sampling period is given by $$\tau = \frac{T_s}{N_s} = \frac{1}{N_s B}$$

Overall, the requirement that $T_{max} \ll \tau$ is succinctly expressed using the above equations as $$0.5 N_s (N-1) B \ll f_c$$

For example, in a system with 8 antennas spaced at half the wavelength, operating at carrier frequency of 150 MHz, with 25 kHz signal bandwidth and oversampling ratio of 4, the above condition is evaluated to 0.0023≪1, which definitely holds.

Figure 1E:
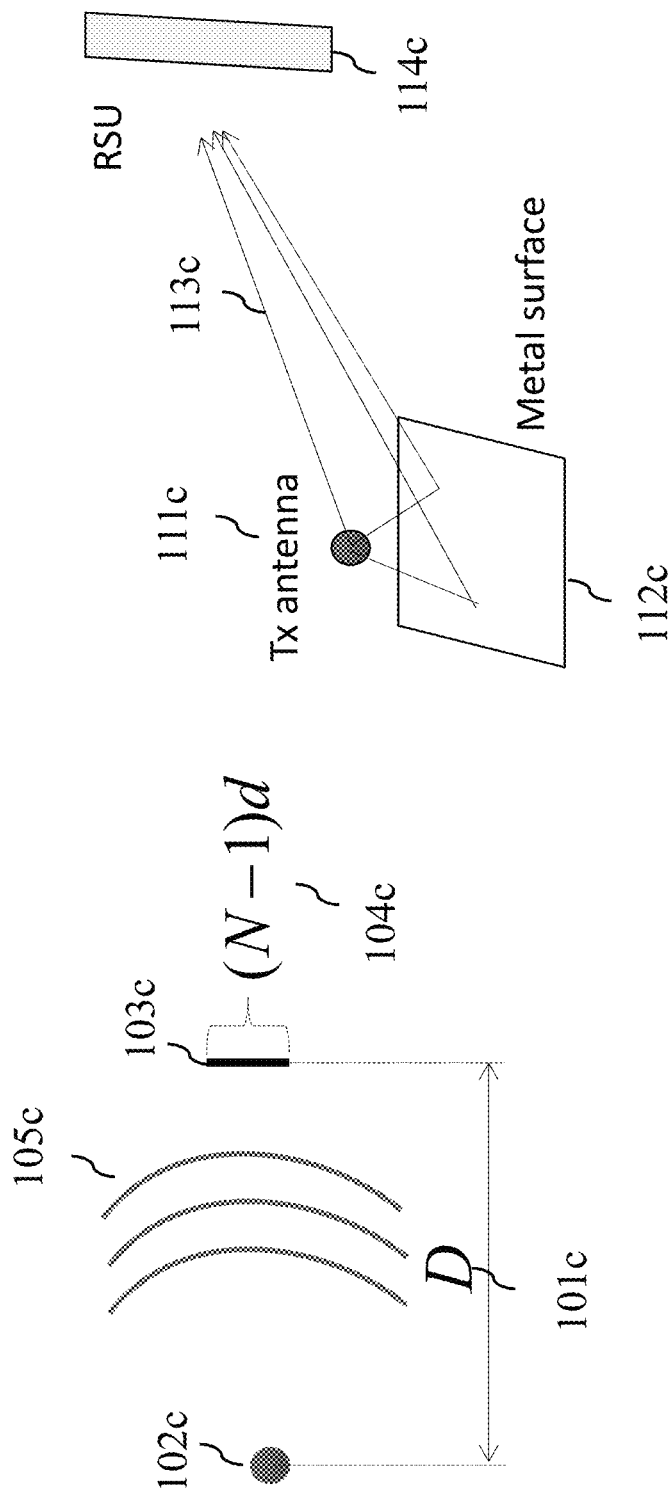
FIG. 1E is a schematic illustrating a second requirement regarding the notion of AoA, according to embodiments of the present disclosure.

FIG. 1E is a schematic illustrating the second requirement regarding the notion of AoA, according to embodiments of the present disclosure. Specifically, the second requirement regarding the notion of AoA, is that the radio waves received on the antenna array resemble plane waves. This occurs when the distance 101c between the source 102c and antenna array (i.e., receiver) 103c is large relative to the antenna array size 104c. Intuitively, that means that the wavefront 105c of spherical wave radiated from a point source looks like the wavefront of a plane wave at the antenna array.

Specifically, denoting with D the distance between the source (transmitter) and the antenna array (receiver), we require that $$D \gg (N-1)d = 0.5(N-1)\lambda_c$$

For example, in a system with 8 antennas arranged in a vertical line array, operating at carrier frequency 150 MHz, assuming the inter-antenna separation is half the wavelength, using the above formula, we get that D≫7m, which is fairly realistic in, for instance, vehicle to infrastructure (V2I) communications.

In yet another scenario, a transmitter antenna 111c, mounted on a vehicle, radiates radio waves, which upon reflection from the metal surface of the rooftop 112c combine into a plane wave 113c, which impinges the antenna array of the roadside unit (RSU) 114c.

While the above conditions are derived assuming the receiver antennas are arranged in a vertical line array, the same procedure applies for any other antenna configurations (e.g., rectangular array and so on).

Under the above stated conditions, the multiple antennas on the receiver behave as a phased array. This implies the notion of an angle of arrival (AoA) of a radio wave impinging upon the array. Namely, an angle of arrival is associated with each (approximately) plane wave impinging upon the antenna array and carrying a packet. Therefore, in addition to time offset and frequency offset, each packet is also characterized with its own angle of arrival. We emphasize that the notion of AoA is only possible under the above stated conditions. Otherwise, AoA is not defined.

Another realization is that in order to separate collided packets, our systems and methods need to include phase noise, i.e., rapid, short-term, random fluctuations in the phase of a waveform. For example, clocks and oscillators in communication systems in both transmitters and receivers, give rise to a considerable amount of carrier phase noise. This leads to significant performance degradation, if the phase noise is not estimated and properly compensated. In addition, an uncompensated phase noise may even cause a complete failure of the communication link between the transmitter and receiver.

Specifically, in our packet separation problem we are trying to solve, the effects of uncompensated phase noise can have a more detrimental impact on the overall performance. Namely, because the traditional construct of packet separation algorithms will treat a certain amount of phase noise as an additional frequency offset, which, in turn, leads to wrong estimates of frequency offsets. Moreover, phase noise corresponding to one packet may "leak" and be treated as an additional frequency offset corresponding to some other packet, leading to wrong frequency offset estimate of that other packet. Which all, in turn, leads to performance degradation.

We solve for the uncompensated phase noise effects by performing a sparse recovery without considering the phase noise. Otherwise the search space would be prohibitively large. However, we consider the phase noise in the separation of the found packet transmissions in the received signal.

To better understand this, conceptually, the dictionary matrix of the sparse recovery can be constructed such that each column is an atom corresponding to a specific combination of time offset, frequency offset, angel of arrival, payload symbols and phase noise variations. A practical difficulty is that the number of possible combinations of payload symbols for a given triplet of the time offset, frequency offset and angle of arrival is finite, but extremely large. In addition, if for each triplet of the time offset, frequency offset and angle of arrival, and a particular combination of payload symbols, we consider all possibilities of phase noise variations, the number of atoms becomes infinitely large. This is because there are infinitely many possibilities for phase noise variations for each combination of payloads symbols. Therefore, we cannot directly incorporate phase noise in the dictionary matrix.

In other words, the phase noise is indirectly incorporated in the sparse recovery by estimating most likely payload symbols for each triplet of the time offset, frequency offset and angle of arrival. We point out that finding the most likely payload symbols is done in conjunction with estimating the phase noise. That is, for a given triplet of the time offset, frequency offset and angle of arrival, the phase noise is, depending of the employed modulation format, either (1) jointly estimated with payload symbols, or (2) estimated and compensated, and then the most likely payload symbols are detected. Thus, effectively each column in the dictionary matrix indirectly incorporates the information about the phase noise.

The contribution of the recovered packet is removed from the received (residual) signal and the resulting signal is fed back for the following iteration. In doing so, the contribution of the recovered packet in the overall received signal is computed. We point out that the estimated phase noise corresponding to the recovered packet is directly incorporated in this computation. Otherwise, the computed contribution of the recovered packet in the received signal would be wrong and the packet recovery in the upcoming iterations would lead to completely wrong estimates of the parameters and symbols of the collided packets.

FIG. 1F is a schematic illustrating the arrrival model including the packet structure of the users transmitting packets of FIG. 1D, according to embodiments of the present disclosure. As noted above, the K different users 101b, 102b, 103b, 104b, transmit signals over respective channels 11b, 112, 113b, 114b, to a receiver 120b employing M antennas. The symbols of the k-th user are formatted into packets $s_k \in \mathbb{C}^{N \times 1}$, where each packet is a concatenation of a preamble $p \in \mathbb{C}^{M_1 \times 1}$ and payload $p_k \in \mathbb{C}^{M_2 \times 1}$, i.e., $s_k = [p^T p_k^T]^T$ and M1+M2=N. The preamble is known in advance, common to all packets, and used to separate signals originating from different users. The payloads carry information and are detected on the receiver side.

The packet structure of the users transmitting packets 111d, 112d, 113d, is depicted in FIG. 1F. As already stated, all K packets use the same preamble 101d, while their payloads 102d, 103d, 104d carry random messages. To better explain this process of the arrival model, here is a full explanation.

Arrival Model

In the considered scenario, K different users transmit signals to a receiver employing multiple antennas. The symbols of the k-th user are formatted into packets $s_k \in \mathbb{C}^{N \times 1}$, where each packet is a concatenation of a preamble $p \in \mathbb{C}^{M_1 \times 1}$ and payload $p_k \in \mathbb{C}^{M_2 \times 1}$, i.e., $s_k = [p^T p_k^T]^T$ and $M_1 + M_2 = N$. The preamble is known in advance, common to all packets, and used to separate signals originating from different users. The payloads carry information and are detected on the receiver side.

Each user, k, modulates its packet $s_k$ and transmits a waveform $x_k(t)$ obtained as $$x_k(t) = M(s_k), 0 \le t \le T, \quad (1)$$

where M denotes a modulation operator. The duration of the transmitted waveform is $T = NT_s$, where $T_s$ is the symbol duration. Without loss in generality, we assume the transmitted power of user k is contained in the corresponding channel gain.

The users send signals asynchronously so that the transmitted waveform, $x_k(t)$, experiences delay $\tau_k$. This delay also incorporates the propagation delay between user k and the receiver.

In addition, each waveform is impaired by frequency offset $f_k$ and phase noise $\theta_k(t)$. These impairments are unavoidable in the communication system, and more so when inexpensive oscillators are employed in the transmitters, such as in the IoT devices.

Finally, under the conditions that the propagating radio waves impinge upon the receiver antenna array as plane waves and that the maximum propagation delay of a wave across the array is much smaller than the sampling time, each packet is characterized with an angle of arrival (AoA) $\alpha_k$.

The signal at the receiver is a superposition of the received signals originating from all active users. The overall received signal is pre-processed and downconverted with so-called receiver front end processing. The complex baseband representation of the receiver signal at antenna m is then given by $$r_m(t) = \sum_{k=1}^{K} h_k x_k(t-\tau_k) e^{j2\pi f_k(t-\tau_k)} e^{-j\pi\left(1+\frac{f_k}{f_c}\right)m\cos\alpha_k} e^{j\theta_k(t)} + v_m(t) \quad (2)$$

Above, $v_m(t)$ is a circularly symmetric additive white Gaussian noise (AWGN) process, i.e., $v_m(t): CN(0,\sigma^2)$, $h_k \in C$ is a coefficient (gain) of the channel between user k and the receiver, while $f_c$ is the nominal carrier frequency of the transmission. The above model corresponds to a block flat fading channel and handles narrowband systems with relatively short packets (shorter than the channel coherence time). Additionally, the model can also handle channels with a single dominant path.

Figure 2:
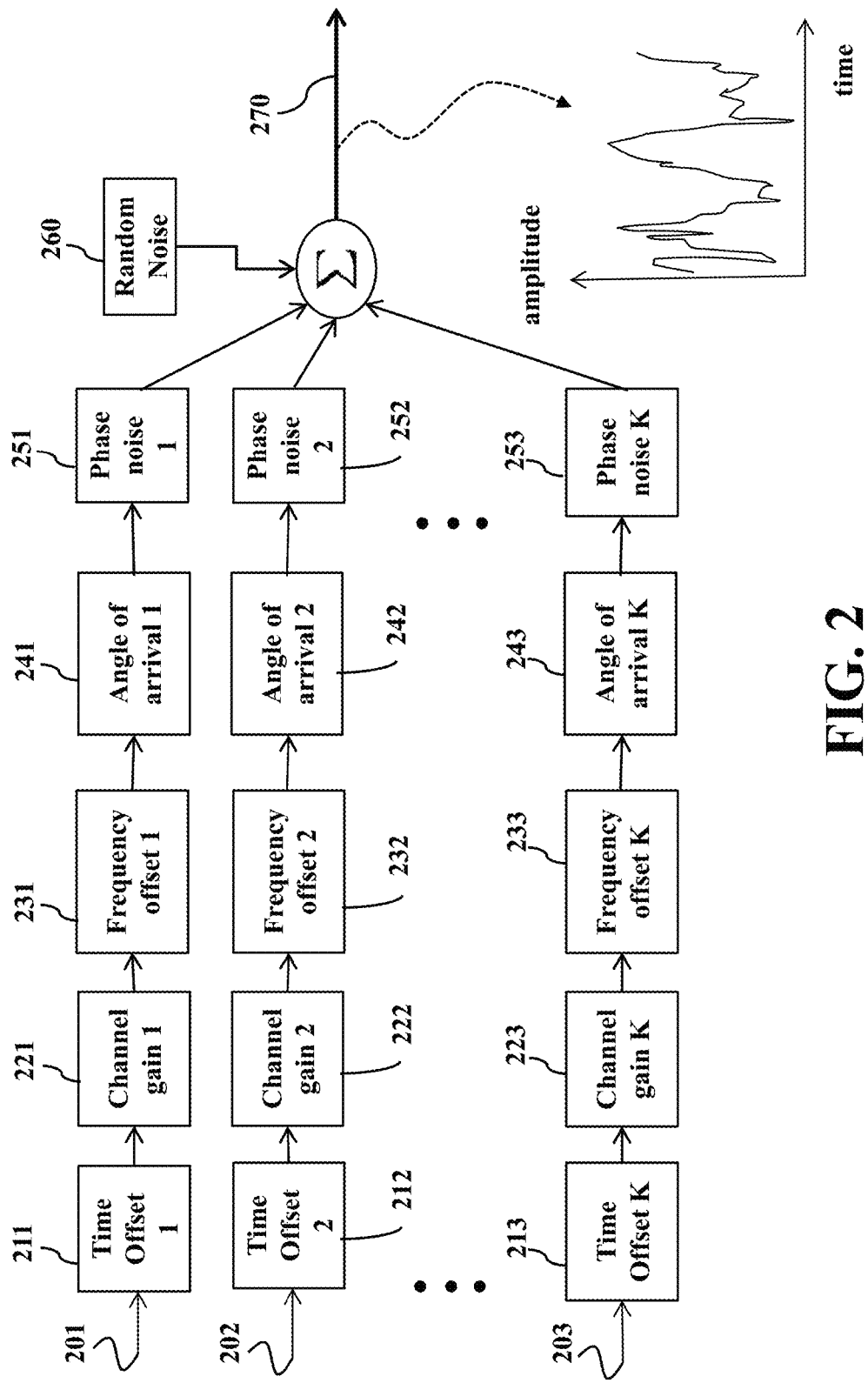
FIG. 2 is a schematic of a generative model for the received signal, according to embodiments of the present disclosure.

FIG. 2 is a schematic of a generative model for the received signal, according to embodiments of the present disclosure. In particular, the modulated users' streams 201, 201, 203, experience random delays 211, 212, 213, random channels 221, 222, 223, random frequency offsets 231, 231, 233, and impinge upon the receiver array at random angles of arrival 241, 242, 243. In addition, the carrier phases of all streams exhibit random and independent fluctuations 251, 252, 253. The superposition of the resulting streams, together with additive random noise 260 yields the received signal 270. The methods described here aim to recover underlying streams from the received signal 270. We emphasize that the proposed method can be extended to other channel models. As such, multi-path channels can be handled by transmitting the Orthogonal Frequency Division Multiplexing (OFDM) waveform and employing the proposed packet separation method in each frequency bin. On the other hand, slow variation of channel coefficients can also be estimated together with phase noise. We note that the frequency offsets $f_k$ and phase noise realizations $\theta_k(t)$ are independent across different users because they are caused by different oscillators. Each $\theta_k(t)$ is modeled as a Wiener process, meaning that the phase noise changes during two separate time intervals are independent and Gaussian distributed, i.e., $$\theta_k(t+\Delta t) - \theta_k(t) : N(0, \sigma_p^2(\Delta t)), \quad (3)$$

where the variance $\sigma_p^2$ depends on the time difference $\Delta t$.

The complex received signal $r_m(t)$, m=1, . . . , M over some observation time window of duration $T_{obs}$ is sampled with oversampling factor $N_o$, yielding $N_o T_{obs}/T_s$ samples. The vector of the generated samples, $r_m$, m=1, . . . , M is the input to the proposed packet separation algorithm. The proposed method estimates the number of colliding packets K, their delays $\tau_k$, frequency offsets $f_k$, angle of arrivals (AoAs) $\alpha_k$, phase noise realizations $\theta_k(t)$ and channel gains $h_k$, with the ultimate goal to detect the transmitted payload symbols $p_k$, k=1, . . . , K.

The packet separation algorithm of the present disclosure is described in the continous time domain to simplify the exposition. However, as one may expect, the received signal $r_m(t)$, m=1, . . . , M is discretized and all processing is done in the discrete time domain.

FIG. 3 is a block diagram of the outline of the processing, according to embodiments of the present disclosure. Specifically, the received signal 270 is first processed through the matched filter bank (MFB) 310, as further explained below in the MFB section. An area for greed search around the packet coarse estimate obtained from the MFB is then identified 320. The most likely payload bits are detected and the corresponding objective function is evaluated for each bin from the search area 330, as further explained below in the Grid Search section. The computed objective is optimized 340 and the final estimates of the packet parameters and bits are output 350. The estimate of the received signal due to the recovered packet is evaluated and used to update the residual signal 360, as further explained below in the Residual Signal and Iterations section. The residual signal is treated as received signal in the following iteration.

Delay and Frequency Offset Domain

Packets transmitted by different users likely differ in delay, or frequency offset, or angle of arrival, or in any combination of two, or in all three. Therefore, the delay, frequency offset and angle of arrival are the domains exploited to separate different packets. Formally, we assume that all colliding packets are within the set $$S = T \times F \times A = \{(\tau, f, \alpha) : \tau \in [0, T_{max}], f \in [f_{min}, f_{max}], \alpha \in [\alpha_{min}, \alpha_{max}]\}, \quad (4)$$

where $T_{max}$, $f_{min}$, $f_{max}$, $\alpha_{min}$, $\alpha_{max}$ are, respectively, the maximum delay, minimum and maximum frequency offsets, and minimum and maximum angles of arrival, all dependent upon the specific application and employed oscillators.

The range of delays T is discretized and the ordered set of discrete delays is $T_d$. Similarly, the range of frequency offsets F is discretized to yield $F_d$. Finally, the range A after discretization becomes $A_d$. The bin size chosen in each discretization depends on specific application, resolution properties of the employed preamble, and available computational resources. Overall, the discretized search space for the packet separation method is $S_d = T_d \times F_d \times A_d$.

Our packets separation method relies on a fact that the number of colliding packets is much smaller than the number of bins in the search space. Namely, the number of bins in $S_d$ is usually extremely large, for example hundreds or even thousands. On the other hand, the expected number of packets being transmitted within the observation window is often not larger than 10. In other words, only a small number of bins in search space $S_d$ are occupied by the packets, while the other bins are empty. Essentially, our packet separation method is a form of sparse recovery.

Matched Filter Bank (MFB)

Figure 4A:
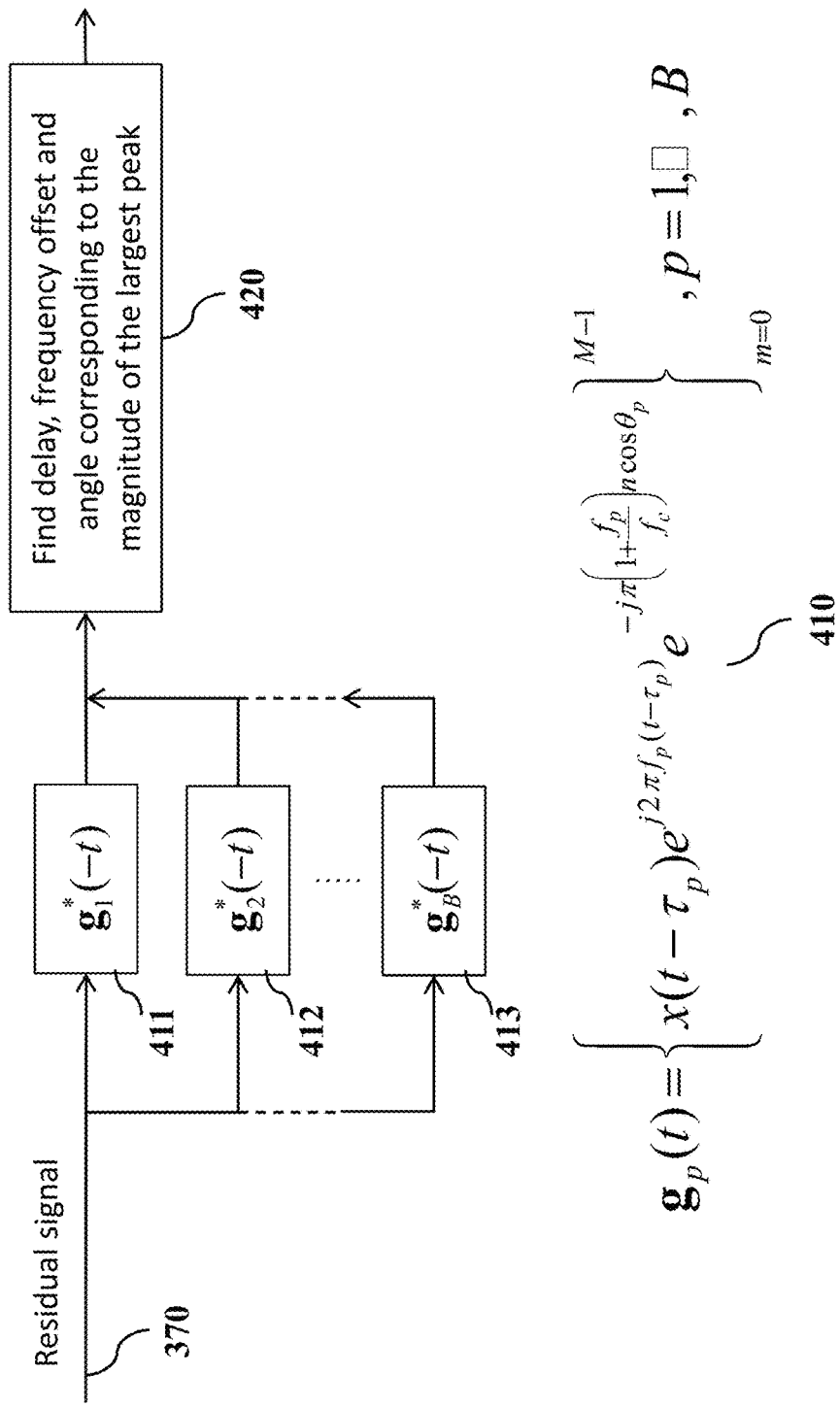
FIG. 4A and FIG. 4B are schematic diagrams illustrating: the received signal in the first iteration (the residual signal in all other iterations) is at the beginning of the iteration processed through the Matched Filter Bank, according to embodiments of the present disclosure.
Figure 4B:
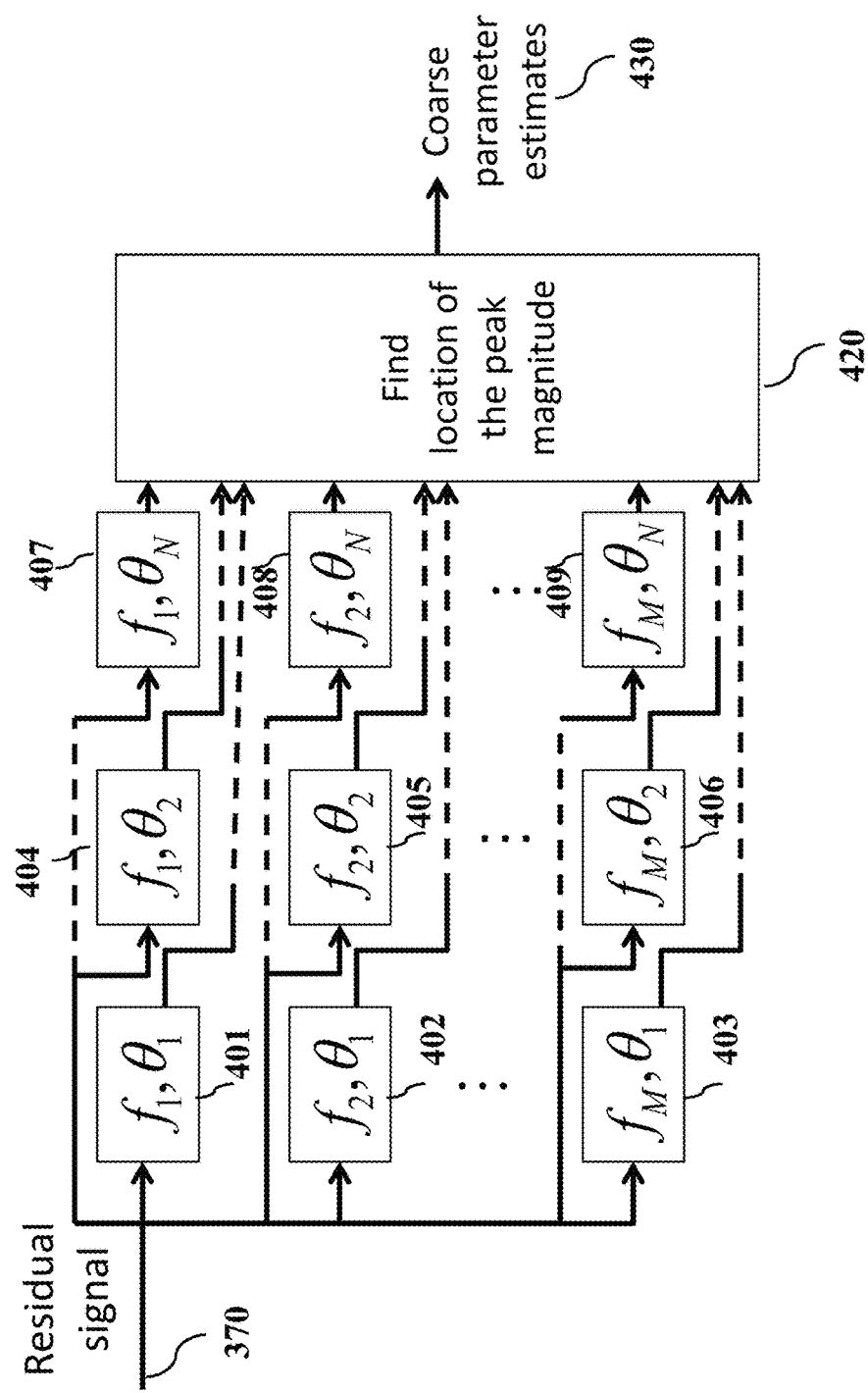

FIG. 4A and FIG. 4B are schematic diagrams illustrating the received signal in the first iteration (the residual signal in all other iterations) is at the beginning of the iteration processed through the Matched Filter Bank, according to embodiments of the present disclosure.

In regard to step 310, the Matched Filter Bank (MFB) may be further explained. For example, the received signal in the first iteration 270 (the residual signal in all other iterations 370) is at the beginning of the iteration processed through the Matched Filter Bank, depicted in FIG. 4A.

Referring to FIG. 4A, the received/residual signal $\{r_m(t)\}_{m=1}^{M}$ is filtered through a bank of matched filters where the impulse response of each filter 411, 412, 413 is essentially the preamble waveform, tuned to a specific frequency offset from $F_d$ and angle of arrival from $A_d$ 410. This is the first step in the packet separation method, whose aim is to coarsely locate 420 the packet with largest power in the considered search area $S_d$.

Referring to FIG. 4B, the MFB is more formally described in the following. Let p(t) denote the modulated waveform of the preamble, $$p(t)=M(p), \quad 0 \le t \le T_1, \tag{5}$$

where $T_1=M_1T_s$ is the time duration of the modulated preamble. The number of filters in the MFB is equal to the cardinality of the set $F_d \times A_d$. The template (i.e., time reversed impulse response) of each filter in the MFB 401, 402, 403, 404, 405, 406, 407, 408, 409, corresponding to a signal received on each antenna m, is $$p_{f,\alpha,m}(t) = p(t)e^{j2\pi ft}e^{-j\pi\left(1+\frac{f}{f_c}\right)m\cos\alpha}, \quad 0 \le t \le T_1 \tag{6}$$

where $f \in F_d$ and $\alpha \in A_d$. The output from filter $p_{f,\alpha}(t)$ is given by $$y_{f,\alpha}(t) = \sum_{m=1}^{M} r_m(t) * p_{f,\alpha,m}(-t), \tag{7}$$

where * denotes the convolution.

The initial estimates of the frequency offset, delay and angle of arrival of a packet 430 directly follow from the location of the peak of the MFB output 420 in the search area $S_d$, i.e., $$(\hat{\tau}_0, \hat{f}_0, \hat{\alpha}_0) = \arg\max_{(t,f,\alpha)\in S_d} |y_{f,\alpha}(t)|. \tag{8}$$

In the conventional approach, the MFB estimates $\hat{\tau}_0, \hat{f}_0$ and $\hat{\alpha}_0$ are the final estimates of the parameters corresponding to the packet with largest power. In our approach, those are coarse parameter estimates. The following step performs grid search around $(\hat{\tau}_0, \hat{f}_0, \hat{\alpha}_0)$.

Grid Search

FIG. 5A to FIG. 5D are schematic diagrams (FIGS. 5A, 5C and 5C) and a block diagram/flow chart (FIG. 5B) illustrating aspects of the grid search, according to embodiments of the present disclosure.

Figure 5A:
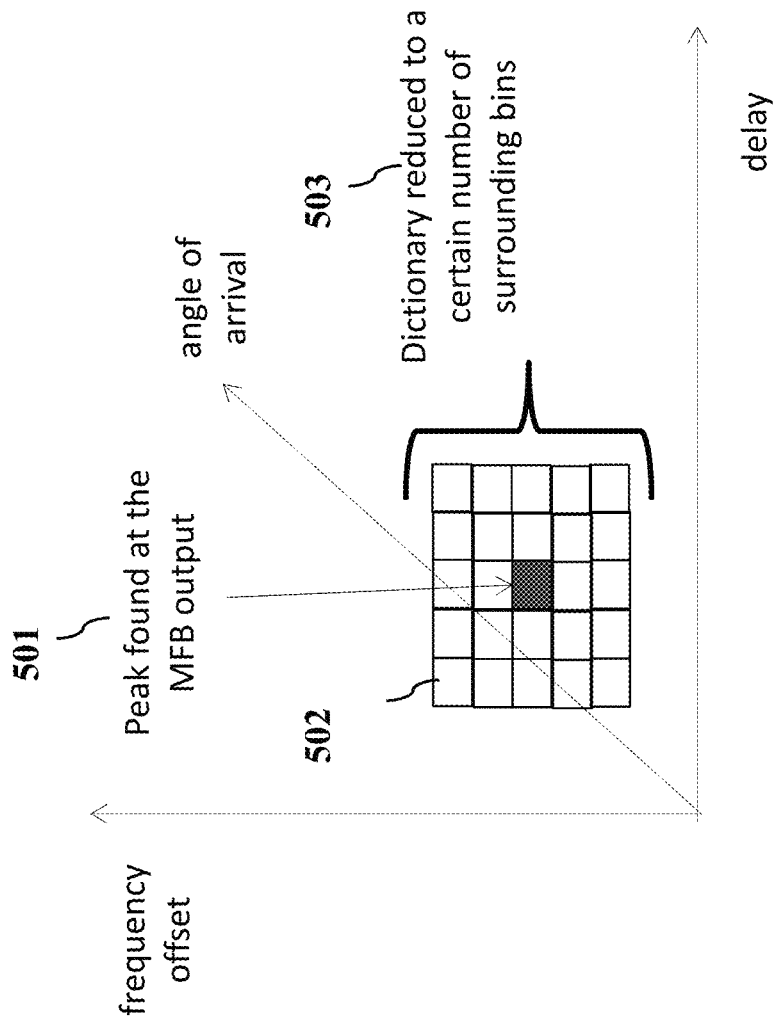
FIG. 5A to FIG. 5E are schematic diagrams (FIGS. 5A, 5C, 5D and 5E) and a block diagram/flow chart (FIG. 5B) illustrating aspects of the grid search, according to embodiments of the present disclosure.
Figure 5B:
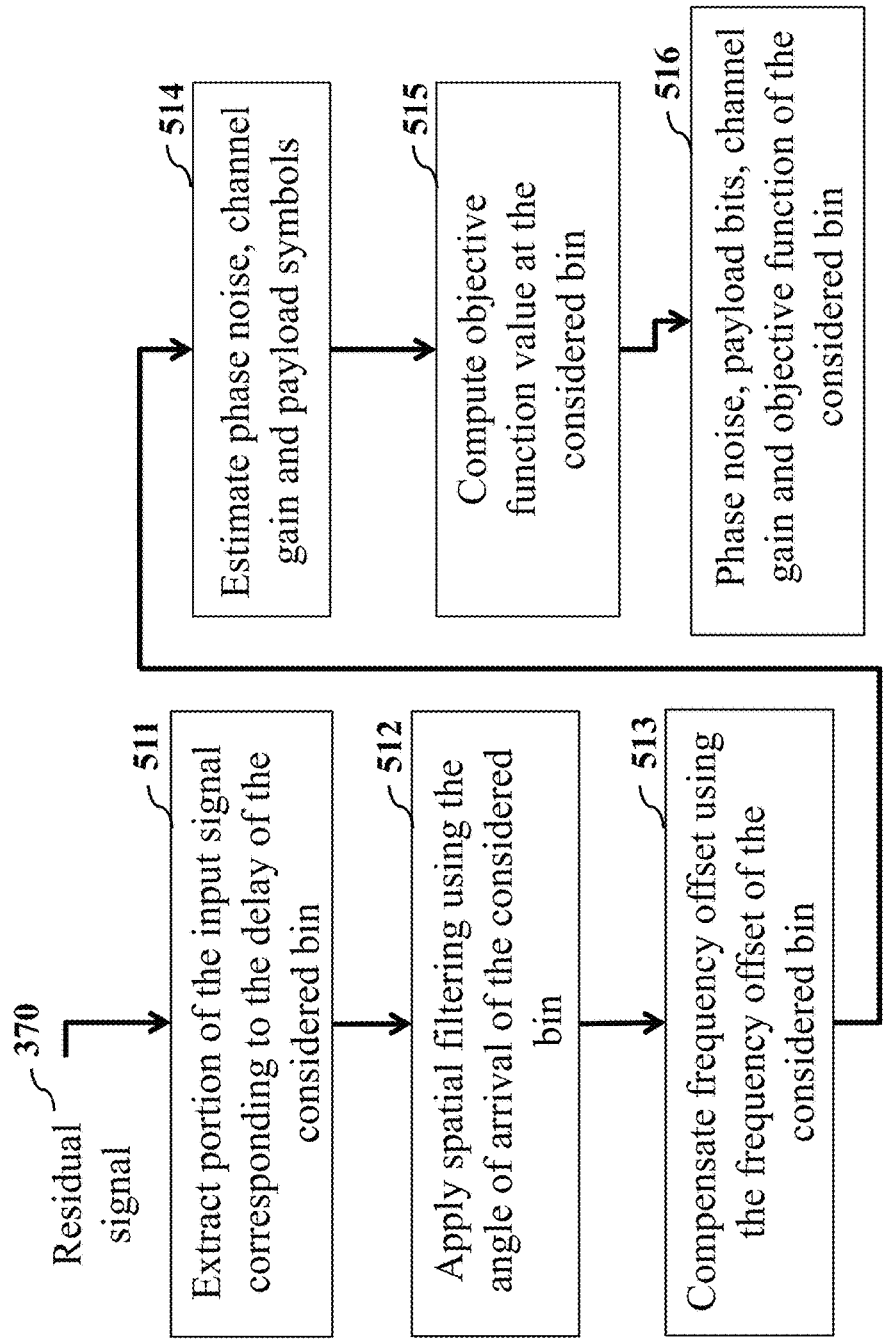
Figure 5C:
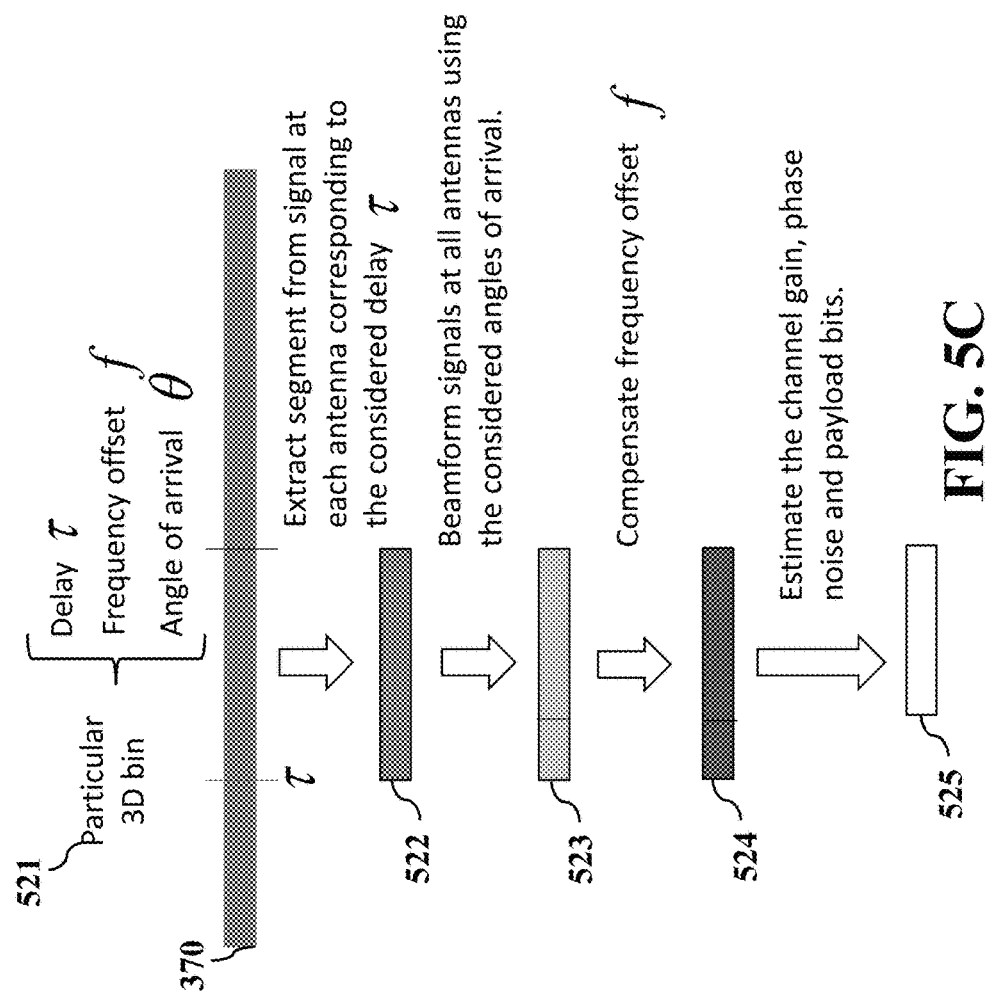

Regarding step 330, this step considers a certain number of $(\tau,f,\alpha)$ bins around the MFB estimate $(\hat{\tau}_0, \hat{f}_0, \hat{\alpha}_0)$. For each considered $(\tau,f,\alpha)$ bin, we detect what the transmitted symbols would be if a packet were indeed located at that $(\tau,f,\alpha)$ bin and evaluate an objective function based on the detected symbols. The delay, frequency offset and angle of arrival corresponding to the $(\tau,f,\alpha)$ bin where the objective function achieves optimum are the final estimates of the delay, frequency offset and angle of arrival of the considered packet. More formally, the grid search starts with identifying the set of $(\tau,f,\alpha)$ bins 502 around the MFB estimate $(\hat{\tau}_0, \hat{f}_0, \hat{\alpha}_0)$ 501 of FIG. 5A, defined as $$N(\hat{\tau}_0,\hat{f}_0,\hat{\alpha}_0)=\{(\tau,f,\alpha): |\tau-\hat{\tau}_0|\le \overline{T}, |f-\hat{f}_0|\le \overline{F}, |\alpha-\hat{\alpha}_0|\le \overline{A}\}, \tag{9}$$

where $\overline{T}$, $\overline{F}$ and $\overline{A}$ specify the size of the search area. These values are chosen based on application, desired accuracy, employed preamble, and expected arrival scenario. This is depicted in FIG. 5A. In the following, we explain how the payload symbols are detected and objective function is evaluated for each $(\tau,f,\alpha)$ point 521 from the set $N(\hat{\tau}_0,\hat{f}_0,\hat{\alpha}_0)$. This process is depicted in FIGS. 5B and 5C.

If a packet is delayed by $\tau$, the portion of the received/residual signal $r_m(t)$ 370 containing that packet is extracted 511 to yield signal 522

$$r_{\tau,m}(t)=r_m(t-\tau)1_{[0,T]}(t), \quad 0 \le t \le T, \quad m=1,\ldots,M, \tag{10}$$

where $1_{[t_1,t_2]}(t)$ is 1, if $t_1 \le t \le t_2$, and zero otherwise.

If the considered packet has frequency offset f and angle of arrival $\alpha$, the signal 522 is beamformed (spatially filtered) 512, which yields the beamformed signal 523, given by $$r_{\tau,f,\alpha}(t) = \frac{1}{M}\sum_{m=1}^{M} e^{-j\pi\left(1+\frac{f}{f_c}\right)m\cos(\alpha)} r_{\tau,m}(t). \tag{11}$$

Finally, the resulting signal is frequency offset compensated 513 using frequency offset f to yield 524

$$\tilde{r}_{\tau,f,\alpha}(t)=r_{\tau,f,\alpha}(t)e^{-j2\pi ft}, \quad 0 \le t \le T. \tag{12}$$

Assuming the power of the interfering packets is relatively small, the compensated signal $\tilde{r}_{\tau,f,\alpha}(t)$ effectively contains the transmitted packet, impaired with the carrier phase noise, block flat fading channel and AWGN noise. This signal is input to a block 514 which performs CPE, channel gain estimation and demodulation to yield, respectively, the estimates of the carrier phase noise $\hat{\theta}_{\tau,f,\alpha}(t)$, channel gain coefficient $\hat{h}_{\tau,f,\alpha}$, and payload symbols $p_{\tau,f,\alpha}$ 525. The joint estimation is outlined in Carrier Phase Estimation, Payload Detection and Channel Gain Estimation section below.

Figure 5D:
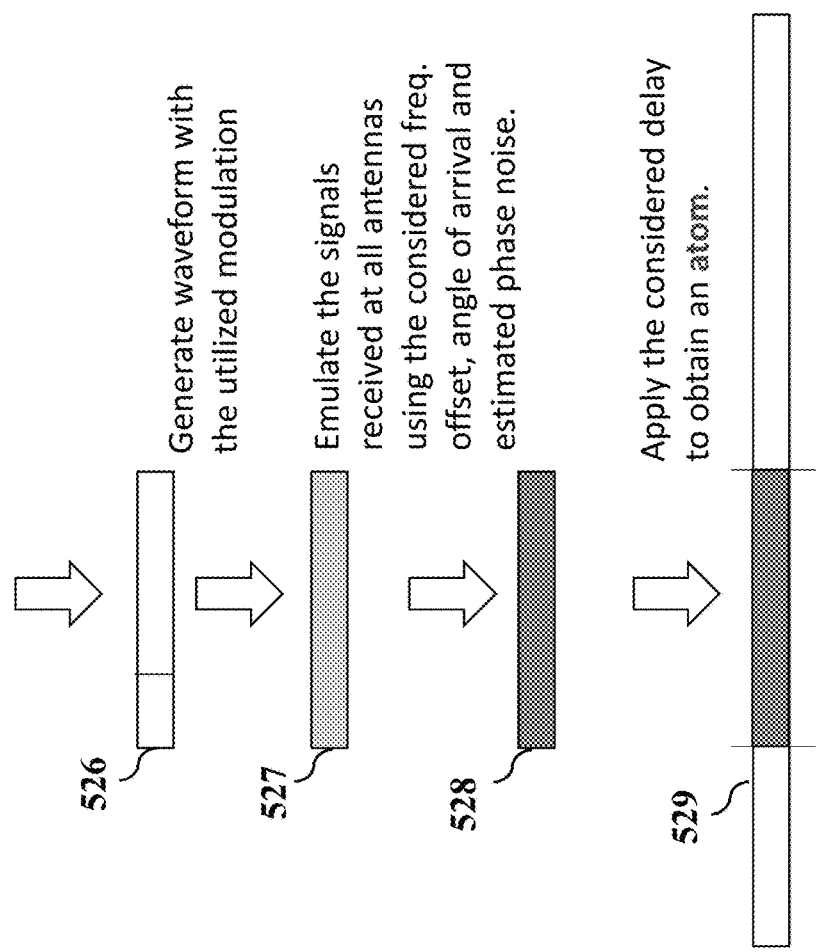
Figure 5E:
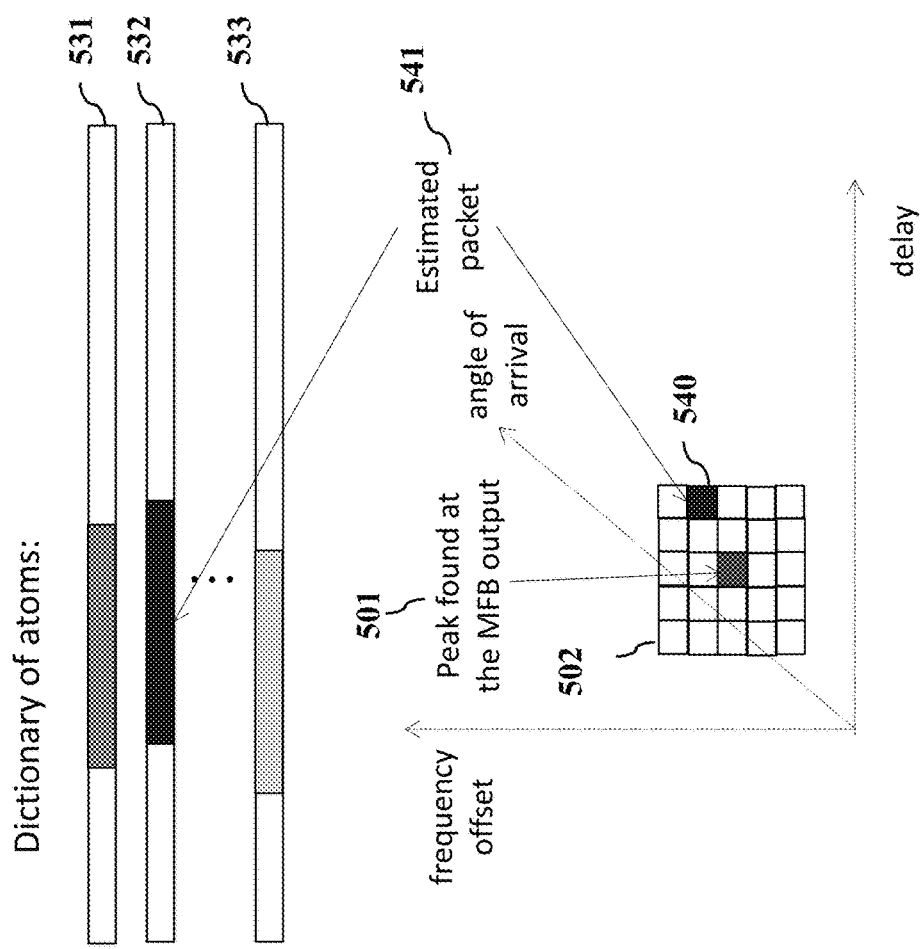

The detected payload symbols 525 are appended to the known preamble symbols and the resulting symbol stream 526 of FIG. 5D is modulated using the utilized modulation format to yield modulated signal 527 of FIG. 5D.

Assuming payload symbols $p_{\tau,f,\alpha}$ 525 were transmitted with delay $\tau$, frequency offset f, angle of arrival $\alpha$ and phase noise $\hat{\theta}_{\tau,f,\alpha}(t)$, the received signal at antenna m is, up to a channel coefficient 528, after positioning the resulting signal in the overall received signal's timeframe given by 529

$$\tilde{z}_{\tau,f,\alpha,m}(t) = M([p^T p_{\tau,f,\alpha}^T]^T)e^{-j\pi\left(1+\frac{f}{f_c}\right)m\cos(\alpha)}e^{j2\pi ft}e^{j\hat{\theta}_{\tau,f,\alpha}(t)}, \tag{13}$$

$$0 \le t \le T.$$

The objective function corresponding to each $(\tau,f,\alpha)$ bin is evaluated 515 as a cross-correlation between the received segment $r_\tau(t)$ and $\tilde{z}_{\tau,f,\alpha,m}(t)$, i.e., $$J(\tau,f,\alpha) = \sum_{m=1}^{M}\int_0^T r_\tau(t)\tilde{z}^*_{\tau,f,\alpha,m}(t)dt, \tag{14}$$

where the integral above is effectively an inner product between the corresponding vectors in the discrete time domain.

The computations outlined in (10), (12), (13) and (14) are done for each $(\tau,f,\alpha) \in N(\hat{\tau}_0,\hat{f}_0,\hat{\alpha}_0)$ to yield atoms 531, 532, 533. The final estimates of delay, frequency offset and angle of arrival of the considered packet are obtained as $$(\hat{\tau}, \hat{f}, \hat{\alpha}) = \underset{(\tau,f,\alpha)}{\arg\max}\, J(\tau, f, \alpha), \qquad (15)$$

where the search is done over the set $N(\hat{\tau}_0,\hat{f}_0,\hat{\alpha}_0)$. The location in the search area with the largest magnitude of the objective function 540 directly determines the recovered packet 541.

The payload symbols, phase noise and channel coefficient corresponding to the estimated pair $(\hat{\tau}, \hat{f}, \hat{\alpha})$ are already detected in the CPE and demodulation stage (for each triplet of delay, frequency offset and angle of arrival 516). They are indexed with $(\hat{\tau}, \hat{f}, \hat{\alpha})$ and are, respectively, $p_{\hat{\tau},\hat{f},\hat{\alpha}}$, $\hat{\theta}_{\hat{\tau},\hat{f},\hat{\alpha}}(t)$ and $\hat{h}_{\hat{\tau},\hat{f},\hat{\alpha}}$.

Residual Signal and Iterations

Figure 7A:
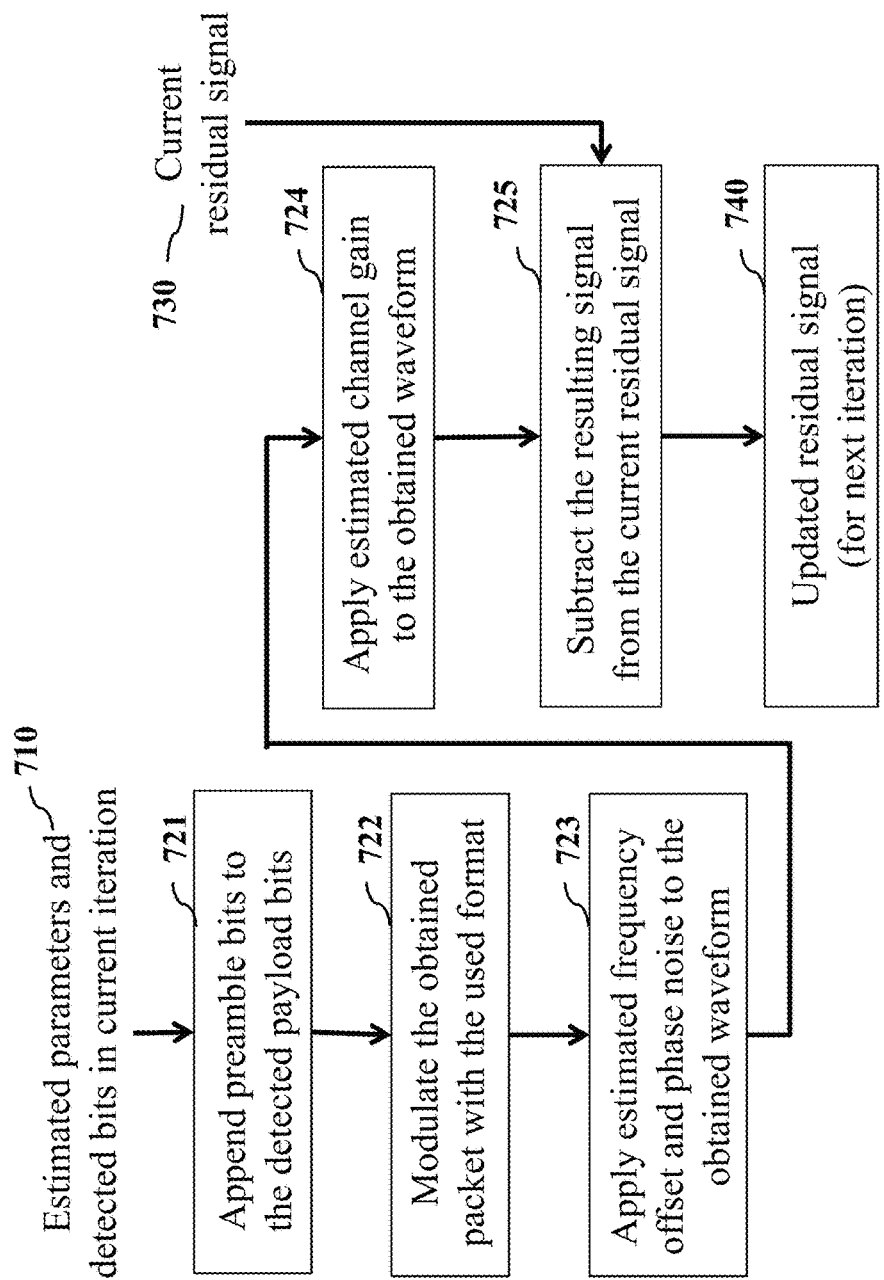
FIGS. 7A and 7B are block diagrams illustrating aspects of the residual signal and iterations, and residual update, according to embodiments of the present disclosure.
Figure 7B:
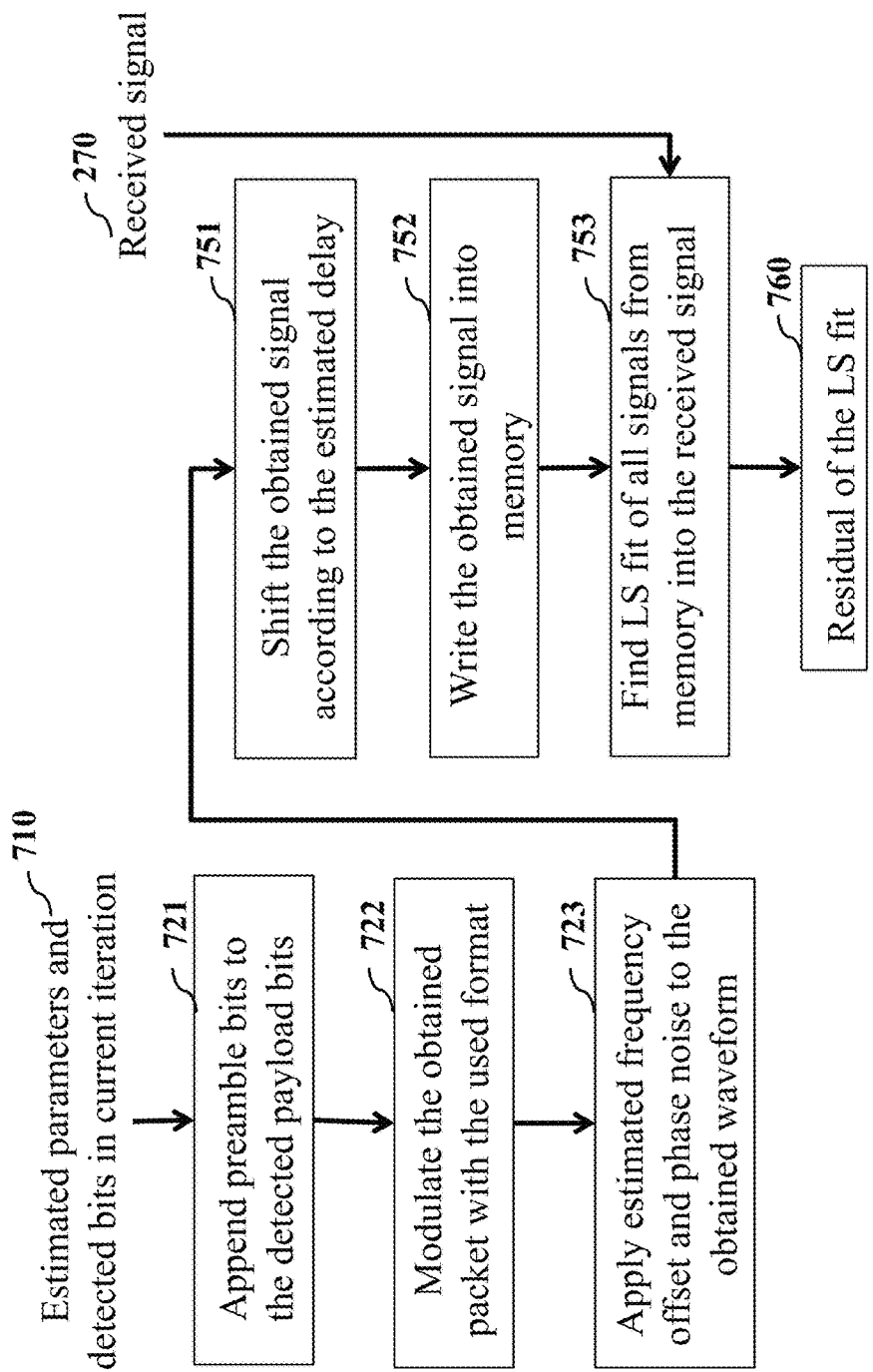

Referring to FIGS. 7A and 7B, and in regard to step 360, the procedure described in the previous part recovers a single packet. The estimate of the received signal at antenna m corresponding to that packet is given by $$r_{\hat{\tau},\hat{f},\hat{\alpha},m}(t) = \hat{h}_{\hat{\tau},\hat{f},\hat{\alpha}} M([p^T\ p^T_{\hat{\tau},\hat{f},\hat{\alpha}}]^T) e^{j\pi\left(1+\frac{f}{f_c}\right)m\cos\alpha} e^{j2\pi \hat{f} t} e^{j\hat{\theta}_{\hat{\tau},\hat{f},\hat{\alpha}}(t)}, \qquad (16)$$

$$0 \le t \le T$$

FIGS. 7A and 7B are block diagrams illustrating aspects of the residual signal and iterations, and residual update, according to embodiments of the present disclosure. The processing steps used to evaluate signal (16) are depicted in FIG. 7A. The input to the processor are the estimated parameters of the recovered packet along with the detected payload bits 710. First, the preamble bits are appended to the detected payload bits 721 and the resulting data stream is modulated 722 with the exploited modulation format. The estimated frequency offset and phase noise are applied to the obtained waveform 723. Then, the estimated channel gain is applied to the resulting waveform.

In the first iteration, the contribution of the recovered packet to the received signal is removed from the received signal to obtain $$\tilde{r}_m(t) = r_m(t) - r_{\hat{\tau},\hat{f},\hat{\alpha},m}(t+\hat{\tau}) 1_{[\hat{\tau},T+\hat{\tau}]}(t), 0 \le t \le T. \qquad (17)$$

In a general iteration, this is achieved by subtracting 725 the estimated contribution of the recovered packet to the received signal from the residual signal 730 corresponding to the current iteration.

The residual signal 740 is then processed using the steps described in MFB and the Grid Search sections, where it is treated as a received signal. The packet separation method continues as an iterative process, where each iteration recovers one packet. The iterations continue until some stopping criterion is satisfied, for example, when the power of the residual signal falls below some threshold dependent on the AWGN noise variance. Alternatively, if Cyclic Redundancy Check (CRC) is part of the transmitted packet, it is used to check if the detected symbols are correct. In that case, the recovery proceeds to next iteration as long as the most recently detected packet passes the CRC. Finally, an ad-hoc method that classifies if a recovered packet has indeed been transmitted, can be devised.

Carrier Phase Estimation, Payload Detection and Channel Gain Estimation

Figure 6:
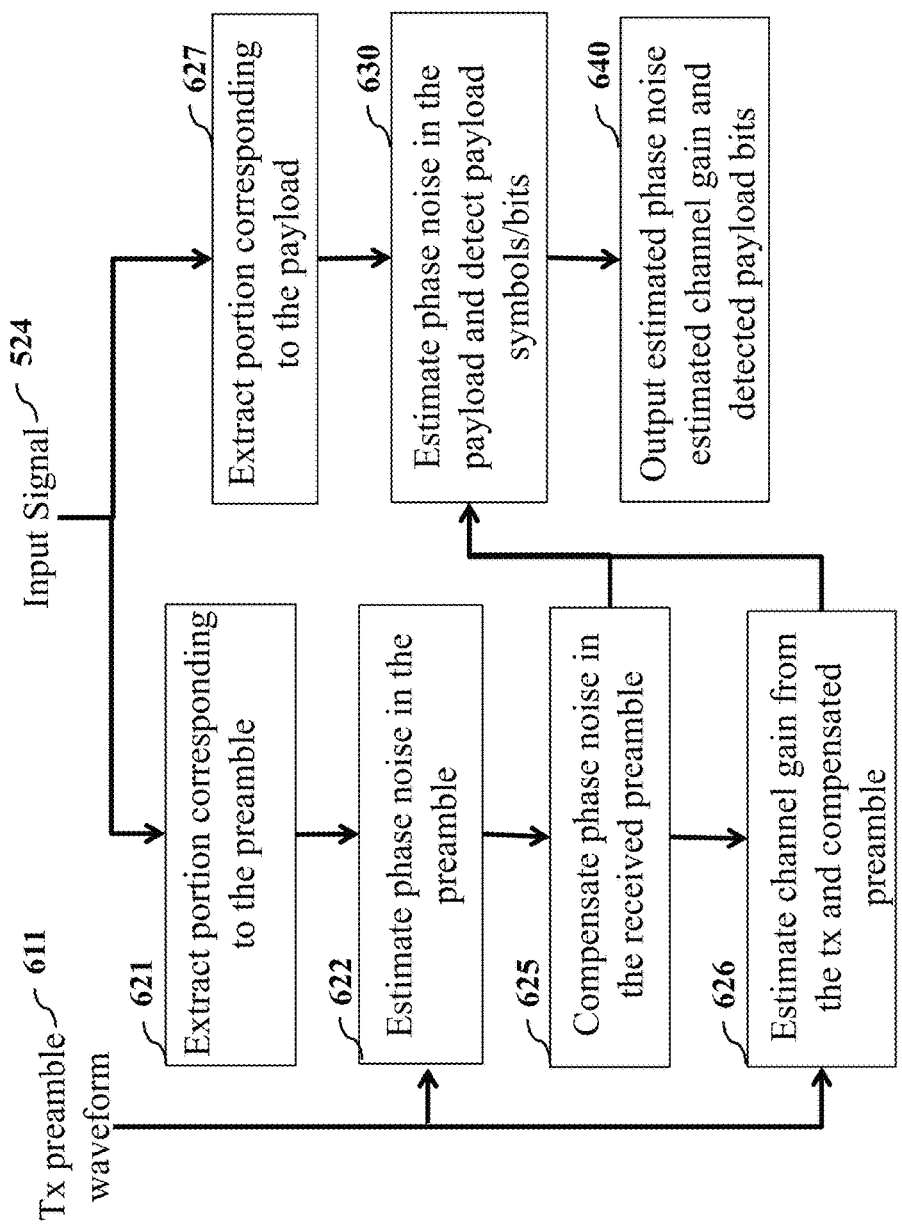
FIG. 6 is a block diagram illustrating the carrier phase estimation, payload detection and channel estimation, according to embodiments of the present disclosure.

The input signal to the block, depicted in FIG. 6, which estimates carrier phase noise, channel gain and payload symbol detection is $\tilde{r}_{\tau,f,\alpha}(t)$ 524, evaluated in (12), and we assume it contains a single, frequency compensated packet. The carrier phase estimation (CPE), channel gain estimation and payload symbol detection are performed in the following three processing steps. Overall, the result 640 from this processing stage are the estimated phase noise $\hat{\theta}_{\tau,f,\alpha}(t)$, estimated channel coefficient $\hat{h}_{\tau,f,\alpha}$ and detected payload symbols $p_{\tau,f,\alpha}$.

Data-Directed Phase Estimation

FIG. 6 is a block diagram illustrating the carrier phase estimation, payload detection and channel estimation, according to embodiments of the present disclosure. This part explains carrier phase estimation (CPE) when the transmitted signal is known in advance at the receiver side. The received signal is, up to a channel gain, modeled as a phase noise impaired transmitted signal, superposed with the AWGN. Since the preamble of a packet is known, its modulated waveform 611 is used as a known transmitted signal to estimate the phase noise fluctuations over the preamble part of the packet.

More formally, known preamble waveform $p(t)$, $0 \le t \le T_1$, is utilized to estimate the phase noise corresponding to the preamble segment of the received signal, extracted 621 from the input signal. Without delving into the details, the phase information is contained in $$u(t) = [\tilde{r}_{\tau,f,\alpha}(t) 1_{[0,T_1]}(t)] p^*(t). \qquad (18)$$

The signal $u(t)$ is processed through a moving average (MA) filter of certain length. Alternatively, $u(t)$ can be processed through a Wiener filter if the variance of the phase noise fluctuations within the signaling interval is known. The phase estimate $\hat{\theta}_{\tau,f,\alpha}(t)$, $0 \le t \le T_1$ 622, is obtained after taking the angle argument of the MA filter output and performing the angle unwrapping operation.

We point out that the described data-directed CPE is also performed in the embodiment which employs CRC routine within the grid search, where if the CRC passes, the detected payload symbols are used to more accurately estimate phase noise corresponding to the considered packet. This processing is detailed in Alternative Step—CRC Check section.

Channel Gain Estimation

Second, the estimated phase noise corresponding to the preamble part is used to compensate 625 $\tilde{r}_{\tau,f,\alpha}(t)$ to yield $$\tilde{r}'_{\tau,f,\alpha}(t) = [\tilde{r}_{\tau,f,\alpha}(t) 1_{[0,T_1]}(t)] e^{-j\hat{\theta}_{\tau,f,\alpha}(t)}, 0 \le t \le T_1. \qquad (19)$$

The channel coefficient is then estimated 626 from $\tilde{r}_{\tau,f,\alpha}(t)$ and preamble waveform $p(t)$ using the least squares (LS). In particular, $$\hat{h}_{\tau,f,\alpha} = \frac{\int_0^{T_1} \tilde{r}'_{\tau,f,\alpha}(t) p^*(t) dt}{\int_0^{T_1} |p(t)|^2 dt} \qquad (20)$$

We emphasize that the channel gain is estimated from the preamble. In another embodiment, the channel gain is re-estimated from the detected payload symbols and this, in general, improves the overall performance of the packet separation method. The details of this embodiment are given in Alternative Step—Channel Gain Re-estimation section.

Blind Phase Estimation

Finally, the phase noise fluctuations corresponding to the payload, extracted 627 from the input signal, is estimated and the payload symbols are detected. In general, this processing step 630 takes the extracted payload portion of the input signal, together with the estimated channel gain and the last sample of the estimated phase noise corresponding to the preamble, as inputs. The specific operations of this processing step depend on the modulation format employed. For the reason, we distinguish the following three cases.

The simplest case arises when the M-ary Phase Shift Keying (MPSK) (which includes the binary and quadrature phase shift keying, BPSK and QPSK) is used to modulate the packet symbols. The blind CPE is performed with a well known M-th power method. The M-th power method starts with raising the samples of $\tilde{r}_{\tau,f,\alpha}(t)$, $T_1 \le t \le T$ to the M-th power. The obtained sequence is filtered through a moving average (MA) or Wiener filter. The phase estimate $\hat{\theta}_{\tau,f,\alpha}(t)$, $T_1 \le t \le T$, is obtained after taking the angle argument of the MA (or Wiener) filter output and performing the angle unwrapping operation. The estimated phase is then applied to the input signal $\tilde{r}_{\tau,f,\alpha}(t)$, $T_1 \le t \le T$, which effectively compensates the phase noise. The payload symbols are detected from the resulting signal using the maximum likelihood and taking into account the estimated channel gain.

In the case when M-ary Quadrature Amplitude Modulation (M-QAM) is employed, the processor jointly performs phase noise estimation and payload symbol detection. Essentially, the method applies a phase noise estimate corresponding to a certain symbol period to compensate received signal at the following symbol period, detects the symbol upon phase noise compensation and re-estimates the corresponding phase noise. In addition, phase noise estimates of consecutive symbols are filtered using the moving average (MA) filter in order to reduce the phase estimation error. We note that the symbol detection is relatively straightforward when MQAM or any other memory-less modulation format is used. This is done by applying the maximum likelihood detection. A care needs to be taken to incorporate the estimated channel gain as it usually has non-zero phase.

Finally, if the utilized modulation format is with memory, for example Gaussian Minimum Shift Keying (GMSK), the joint phase noise estimation and payload symbol detection is performed again. However, when it comes to symbol detection step, the procedure is not as straightforward as with the memory-less modulation formats. Namely, a sequence consisting of the currently considered symbol a certain number of the previous symbols needs to be considered to make a decision on the currently considered symbol. Essentially, the symbol detection part has to be accompanied with a more involved symbol-by-symbol routine specifically designed for the used modulation format.

Alternative Step—Objective Function

One alternative step in the packet separation method described above is outlined here.

As shown in (15), the estimated delay, frequency offset and angle of arrival correspond to $(\tau, f, \alpha)$ bin at which the objective function, measured as the cross-correlation (14), achieves maximum. Alternatively, the objective function at each $(\tau, f, \alpha) \in N(\hat{\tau}_0, \hat{f}_0, \hat{\alpha}_0)$ bin can be defined as the reduction in power of the residual signal caused by declaring that the considered packet has delay $\tau$, frequency offset f, angle of arrival $\alpha$ and contains payload symbols $p_{\tau,f,\alpha}$. More formally, $$J(\tau, f, \alpha) = \sum_{m=0}^{M} \int_0^T |r_{\tau,m}(t) - r_{\tau,f,\alpha,m}(t)|^2 dt, \quad (21)$$

where $r_{\tau,f,\alpha,m}(t)$ is given by $$r_{\tau,f,\alpha,m}(t) = \hat{h}_{\tau,f,\alpha} M([p^T \ p_{\tau,f,\alpha}^T]^T) e^{-j\pi(1+\frac{f}{f_c})m\cos\alpha} e^{j2\pi ft} e^{j\hat{\theta}_{\tau,f,\alpha}(t)}, \quad (22)$$

$$0 \le t \le T,$$

while $p_{\tau,f,\alpha}$, $\hat{\theta}_{\tau,f,\alpha}$ and $\hat{h}_{\tau,f,\alpha}$ correspond to bin $(\tau, f, \alpha)$ and are estimated with the method outlined in Grid Search section. The considered packet is then localized at $(\tau, f, \alpha)$ bin at which the objective function (21) achieves maximum.

Alternative Step—Residual Update

As noted above, FIGS. 7A and 7B are block diagrams illustrating aspects of the residual signal and iterations, and residual update, according to embodiments of the present disclosure. Yet another alternative processing step deals with estimating the channel coefficients. As described, the channel coefficient corresponding to $(\tau, f, \alpha)$ bin is estimated along with phase noise and payload symbols. That estimate is then used in evaluating the residual signal $\tilde{r}_m(t)$ in (17). An alternative approach is to estimate the channel coefficients in iteration i, using the packets recovered up to and including iteration i. More formally, let $\tilde{z}_{\tau,f,\alpha,m}^{(i)}$ denote the contribution, up to a channel coefficient, of the packet recovered in iteration i to the received signal $r_m(t)$, i.e., $$\tilde{z}_{\tau,f,\alpha,m}^{(i)}(t) = \tilde{z}_{\tau^{(i)},f^{(i)},\alpha^{(i)},m}(t+\tau^{(i)}) 1_{[\tau^{(i)}, T+\tau^{(i)}]}(t), \ 0 \le t \le T, \quad (23)$$

where $\tau^{(i)}$, $f^{(i)}$ and $\alpha^{(i)}$ are the estimates corresponding to that packet (i.e., estimated in iteration i) and $\tilde{z}_{\tau^{(i)},f^{(i)},\alpha^{(i)},m}(t)$ is evaluated using (13). The channel coefficients corresponding to packets recovered up to and including iteration i are then estimated as coefficients of the least squares (LS) fit of signals (23) to the received signal $r_m(t)$, m=1, . . . , M. The residual of the LS fit is the residual signal $\tilde{r}_m$=1, . . . , M used in the next iteration i+1. A block diagram of this processing is shown in FIG. 7B.

Similarly to FIG. 7A, the estimated frequency offset and phase noise are applied to the waveform corresponding to the modulated preamble and detected payload bits. The resulting waveform is then shifted according to the estimated delay 751. The obtained signal is stored in the memory 752. The received signal 270 is then represented as a linear combination of all such signals stored in the memory up until the current iteration. The coefficients of linear combination are computed by means of least squares (LS) 753. The residual signal corresponding to the LS fit 760 is the residual signal fed back to the following iteration of the packet separation algorithm.

Alternative Step—Channel Gain Re-estimation

The phase noise, channel gain and payload bits corresponding to a particular $(\tau, f, \alpha)$ bin are estimated from $\tilde{r}_{\tau,f,\alpha}(t)$ as detailed in the Carrier Phase Estimation, Payload Detection and Channel Gain Estimation section. In particular, the channel gain $\hat{h}_{\tau,f,\alpha}$ is estimated from the transmitted and received portions of the signal corresponding to the known preamble. Once the delay, frequency offset and angle of arrival of the considered packet are estimated using (15), the final payload bits, channel gain and phase noise are those corresponding to the recovered bin, as explained in Grid Search section.

However, if the residual signal is updated using the approach described in Residual Signal and Iterations section, the overall performance is improved if the channel gain is re-estimated upon the recovery of the considered packet. Namely, we use the preamble bits and detected payload bits as well as the estimated phase noise corresponding to the recovered bin (τ,f,α) to re-estimate the channel gain. This is done by finding the least squares (LS) fit between the residual signal $\tilde{r}_m(t)$ (that the considered packet has been extracted from) and the predicted signal due to the considered packet, $\tilde{z}_{\tau,f,\alpha,m}(t)$, evaluated in (13). More precisely, the channel gain is re-estimated as $$\hat{h}_{\tau,f,\alpha} = \frac{\sum_{m=1}^{M} \int_0^T \tilde{z}_{\tau,f,\alpha,m}(t) \tilde{r}'_m(t) dt}{\sum_{m=1}^{M} \int_0^T |\tilde{z}_{\tau,f,\alpha,m}(t)|^2 dt} \quad (24)$$

The residual of the LS fit in (24) is the updated residual fed back to the following iteration.

For completeness, if the residual is updated according to the approach described in Alternative Step—Residual Update section, the channel gains of all packets recovered up to and including the current iteration are re-estimated.

Alternative Step—CRC Check

Most communication protocols employ Cyclic Redundancy Check (CRC) as a means to flag, with very high probability, if a detected bit stream has indeed been transmitted. The CRC bits are computed on the transmitter side, based on the payload bits and appended to the payload. The CRC bits are obtained as a reminder in the division of a polynomial, representing the payload bits, with the pre-defined CRC polynomial. Upon the detection of the payload and CRC bits on the receiver side, the polynomial representing that bit stream is divided with the CRC polynomial. The zero reminder flags that the detected bits have indeed been transmitted. Otherwise, there is at least one bit error in the bit stream.

As we have explained in Residual Signal and Iterations section, the CRC check can be used after each iteration to flag if the detected packet has indeed been transmitted. The iterations may be continued as long as the CRC check passes. Once the CRC check fails, the iterations may be stopped. In a slightly different implementation, few more iterations may be allowed after the first CRC check failure. This is because the CRC fails even if a single bit is wrong and this does not necessarily imply that the following iterations will yield packets with errors.

The CRC can be utilized in the grid search stage. Namely, upon the detection of most likely bits corresponding to a bin (τ,f,α)∈N($\hat{\tau}_0,\hat{f}_0,\hat{\alpha}_0$), the CRC is applied. If the CRC passes, the grid search is terminated. This may save a considerable amount of computations as it eliminates the need to estimate phase and bit stream corresponding to each bin in N($\hat{\tau}_0,\hat{f}_0,\hat{\alpha}_0$).

Since the positive outcome of the CRC implies that the checked bit stream has been transmitted with very high probability, this can also be utilized to more accurately estimate the phase noise. Recall that the phase noise is initially blindly estimated for a considered (τ,f,α) bin, as explained in Carrier Phase Estimation, Payload Detection and Channel Gain Estimation section. However, once we know with very high probability the bit stream, it can be utilized to re-estimate the phase noise using one of the (more accurate) data directed methods.

Alternative Step—Spatial Filtering

Multiple antennas on the receiver, together with the narrowband and plane wave assumptions admit defining the angle of arrival. On a par with estimating the angle of arrival of a packet, spatial filtering (i.e., beamforming) is intrinsically used. This is done in (11), where a so-called rectangular windowing of the samples of the signals received across the antenna array is used. Here, we make this notion of spatial filtering more explicit and re-write (11) in a more general form as $$r_{\tau,f,\alpha}(t) = \frac{1}{M} \sum_{m=1}^{M} w_m e^{-j\pi\left(1+\frac{f}{f_c}\right)m\cos(\alpha)} r_{\tau,m}(t), \quad (25)$$

where $w_m$ is the beamformer weight applied in the m-th antenna.

A number of beamformer weights can be used in the packet separation algorithm. Examples include Hanning, Hamming, Kaiser, Blackman, Triangular, Parzen, Welch, Gaussian, Tukey window and so on. In addition, one may design beamformer weights to suit a specific need using one of a variety of designing techniques (such as least squares method and so on).

The expected arrival scenario is what determines the beamformer weights that should be used in the packet separation method. The uniform weights are suitable in the case of completely lack of prior knowledge on the arrival scenario. On the other hand, if it is known that the arrivals are separable and have similar powers, a suitable beamformer might provide a larger side-lobe attenuation at the expense of a wider main-lobe. More interestingly, if it is known that the arrivals are expected to arrive from certain range of angles and the signal-to-noise ratio (SNR) is relatively high, a beamformer can have both narrow main-lobe and large side-lobe attenuation within the range of angles of interest. This is achieved by using most of the degrees of freedom (determined by the number of antennas) to meet beampattern requirements within the range of angles of interest and not posing strict requirements (or not posing any requirement at all) on the beampattern over the remaining angles. The latter may lead to an increased amount of noise being passed through the beamformer, which might be tolerable in the case of relatively higher SNR.

Figure 8:
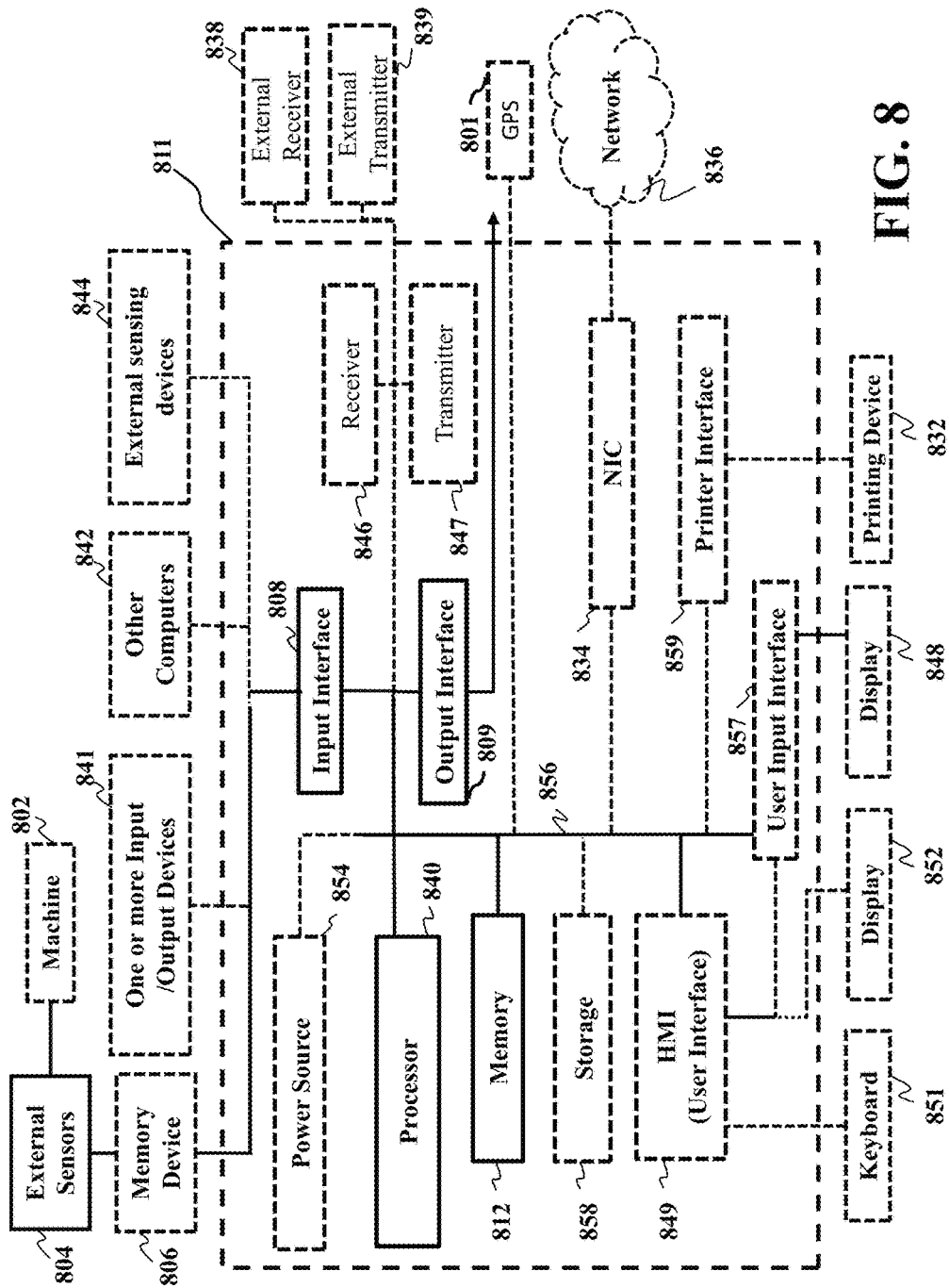
FIG. 8 is a block diagram of illustrating the method of FIG. 1A, that can be implemented using an alternate computer or processor, according to embodiments of the present disclosure.

FIG. 8 is a block diagram of illustrating the method of FIG. 1A, that can be implemented using an alternate computer or processor, according to embodiments of the present disclosure. The computer 811 includes a processor 840, computer readable memory 812, storage 858 and user interface 849 with display 852 and keyboard 851, which are connected through bus 856. For example, the user interface 849 in communication with the processor 840 and the computer readable memory 812, acquires and stores the measuring data in the computer readable memory 812 upon receiving an input from a surface, keyboard surface, of the user interface 857 by a user.

Contemplated is that the memory 812 can store instructions that are executable by the processor, historical data, and any data to that can be utilized by the methods and systems of the present disclosure. The processor 840 can be a single core processor, a multi-core processor, a computing cluster, or any number of other configurations. The processor 840 can be connected through a bus 856 to one or more input and output devices. The memory 812 can include random access memory (RAM), read only memory (ROM), flash memory, or any other suitable memory systems.

Still referring to FIG. 8, a storage device 858 can be adapted to store supplementary data and/or software modules used by the processor. For example, the storage device 858 can store historical device data and other related device data such as manuals for the devices, wherein the devices are sensing device capable of obtaining measured data as mentioned above regarding the present disclosure. Additionally, or alternatively, the storage device 858 can store historical data similar to the measuring data. The storage device 858 can include a hard drive, an optical drive, a thumb-drive, an array of drives, or any combinations thereof.

The system can be linked through the bus 856 optionally to a display interface (not shown) adapted to connect the system to a display device (not shown), wherein the display device can include a computer monitor, camera, television, projector, or mobile device, among others.

The computer 811 can include a power source 854, depending upon the application the power source 854 may be optionally located outside of the computer 811. Linked through bus 856 can be a user input interface 857 adapted to connect to a display device 848, wherein the display device 848 can include a computer monitor, camera, television, projector, or mobile device, among others. A printer interface 859 can also be connected through bus 856 and adapted to connect to a printing device 832, wherein the printing device 832 can include a liquid inkjet printer, solid ink printer, large-scale commercial printer, thermal printer, UV printer, or dye-sublimation printer, among others. A network interface controller (NIC) 834 is adapted to connect through the bus 856 to a network 836, wherein measuring data or other data, among other things, can be rendered on a third party display device, third party imaging device, and/or third party printing device outside of the computer 811.

Still referring to FIG. 8, the measuring data or other data, among other things, can be transmitted over a communication channel of the network 836, and/or stored within the storage system 858 for storage and/or further processing. Further, the measuring data or other data may be received wirelessly or hard wired from a receiver 846 (or external receiver 838) or transmitted via a transmitter 847 (or external transmitter 839) wirelessly or hard wired, the receiver 846 and transmitter 847 are both connected through the bus 856. The computer 811 may be connected via an input interface 808 to external sensing devices 844 and external input/output devices 841. The computer 811 may be connected to other external computers 842. An output interface 809 may be used to output the processed data from the processor 840.

Algorithm Summary

The pseudo-code of the packet separation method is given in FIG. 9. The outputs from the method are detected payload symbols and parameter estimates of the packets (delays, frequency offsets, angles of arrival, phase noise realizations and channel coefficients). We note that in the pseudo-code the channel coefficients in each iteration are estimated using the LS, as described in Alternative Step—Residual Update section, while the objective function is given by cross-correlation (14). As a final remark, we emphasize that the grid search, detailed in Grid Search section, and contained in the inner loop in the pseudo-code, admits parallel implementation in software/hardware as the computations for different $(\tau,f,\alpha)$ bins are not related. Hence, the cardinality of the set $N(\hat{\tau}_0,\hat{f}_0,\hat{\alpha}_0)$ does not impact the computation time.

Features

According to aspects of the present disclosure, the receiver includes a front end to produce a received signal including a combination of the set of packets modified with noise in the common communication medium, wherein each packet includes a preamble common for all packets in the set of packets and a payload unique for at least some packets in the set of packets, and wherein the channel estimator determines the frequency offset of the transmission of each packet from the nominal carrier frequency, the time offset of the transmission of each packet from a common point in time, the angle of arrival of the transmission of each packet, and the channel gain.

According to aspects of the present disclosure, the sparse recovery uses a dictionary matrix approximated with a combination of the preamble with a single payload for each combination of the frequency offsets, the time offsets and the angles of arrival.

According to aspects of the present disclosure, a matched filter bank used by the channel estimator, to reduce a search area in the frequency offset, the time offset and the angle of arrival domains, wherein then, the sparse recovery uses a dictionary matrix approximated with a combination of the preamble with a single payload for each combination of the frequency offsets, the time offsets and the angles of arrival, in the reduced search area.

According to aspects of the present disclosure, the processor is configured to: determine a single combination of the preamble with a most likely payload for each combination of the frequency offsets, the time offsets and the angles of arrival, to produce a dictionary matrix having only one atom for each combination of the frequency offsets, the time offsets and the angles of arrival, such that each atom represents a packet including the preamble and the payload determined for a corresponding combination of the frequency offsets, the time offsets and the angles of arrival, and transmitted over a channel having the corresponding combination of the frequency offsets, the time offsets and the angles of arrival; and determine a set of non-zero gains defining a set of atoms of the dictionary matrix, such that transmission of the atoms from the set of atoms with the corresponding non-zero gains approximates the received signal.

According to aspects of the present disclosure, the processor jointly determines a phase noise of the packet corresponding to the combination of the frequency offsets, the time offsets and the angles of arrival, along with determining the most likely payload for each combination of the frequency offsets, the time offsets and the angles of arrival.

According to aspects of the present disclosure, the channel estimator iteratively determines the frequency offset, the time offset, the angle of arrival, the channel gain, a phase noise and the payload, for each packet, and wherein for each iteration, the channel estimator is configured to: cross-correlate the received signal with each element of a dictionary matrix of the sparse recovery, such that each element of the dictionary matrix is an atom corresponding to a combination of the frequency offset, the time offset and the angle of arrival; select the combination of the frequency offset, the time offset and the angle of arrival, corresponding to a largest magnitude of the cross-correlating; determine the payload and the phase noise of the packet transmitted over the channel for the selected combination of the frequency offset, the time offset and the angle of arrival; and remove a contribution of the recovered packet having the preamble, the payload and the phase noise, which is then transmitted over the selected combination of the frequency offset, the time offset and the angle of arrival from the received signal, wherein the received signal is updated for subsequent iterations.

According to aspects of the present disclosure, the channel estimator iteratively determines the frequency offset, the time offset, the angle of arrival, the channel gain, a phase noise and the payload, for each packet, wherein for each iteration, the channel estimator is configured to: cross-correlate the received signal with each element of a dictionary matrix of the sparse recovery, such that each element of the dictionary matrix is an atom corresponding to a combination of the frequency offset, the time offset and the angle of arrival, select the combination of the frequency offset, the time offset and the angle of arrival, corresponding to a largest magnitude of the cross-correlating; determine the payload and the phase noise of the packet transmitted over the channel for the selected combination of the frequency offset, the time offset and the angle of arrival; perform a cyclic redundancy check (CRC) over the determined payload, if the CRC is accepted, based on a predetermined CRC polynomial, and then re-estimate the phase noise; and remove a contribution of the recovered packet having the preamble, the payload and the phase noise, which is then transmitted over the selected combination of the frequency offset, the time offset and the angle of arrival from the received signal, wherein the received signal is updated for subsequent iterations.

According to aspects of the present disclosure, the channel gain is determined by a least squares fit (LS) between the received preamble of the packet recovered in that iteration, and the transmitted preamble with the determined frequency offset and the angle of arrival.

According to aspects of the present disclosure, the processor determines channel gains corresponding to the packets recovered up to the most recent iteration, wherein the transmission of those packets with those channel gains approximates the received signal.

According to aspects of the present disclosure, the processor applies a spatial filter prior to determining the payload and the phase noise, based on the determined angle of arrival and an expected arrival scenario, to filter the received signal, thereby reducing interference from other packets not yet recovered.

According to aspects of the present disclosure, a cyclic redundancy check (CRC) routine, applied over the determined payload bits using a predefined CRC polynomial, that identifies if the detected payload bits are error-free, and if so, confirming the determined payload bits as the payload bits of a true packet.

According to aspects of the present disclosure, classify, by the channel estimator, which candidate packets are indeed packets; decode, by the decoder, the payloads either separately or jointly, using an estimation of the common communication media as defined by the frequency offsets, the time offsets, the angle of arrivals and the channel gains, of the remaining candidate packets.

According to aspects of the present disclosure, the channel estimator iteratively determines the frequency offset, the time offset, the angle of arrival, the channel gain, a phase noise and the payload, for each packet, and configuring the channel estimator for each iteration for: cross-correlating the received signal with each element of a dictionary matrix of the sparse recovery, such that each element of the dictionary matrix is an atom corresponding to a combination of the frequency offset, the time offset and the angle of arrival; selecting the combination of the frequency offset, the time offset and the angle of arrival, corresponding to a largest magnitude of the cross-correlating; determining the payload and the phase noise of the packet transmitted over the channel for the selected combination of the frequency offset, the time offset and the angle of arrival; and removing a contribution of the recovered packet having the preamble, the payload and the phase noise, which is then transmitted over the selected combination of the frequency offset, the time offset and the angle of arrival from the received signal, wherein the received signal is updated for subsequent iterations.

According to aspects of the present disclosure, the sparse recovery uses a dictionary matrix approximated with a combination of the preamble with a single payload for each combination of the frequency offsets, the time offsets and the angles of arrival. Wherein the channel estimator iteratively determines the frequency offset, the time offset, the angle of arrival, the channel gain, a phase noise and the payload, for each packet, and wherein for each iteration, the channel estimator is configured to: determine a magnitude of a difference between the received signal and each packet corresponding to each element of the dictionary matrix to obtain a metric for each element of the dictionary matrix, such that each element of the dictionary matrix is an atom corresponding to a combination of the frequency offset, the time offset and the angle of arrival; select the combination of the frequency offset, the time offset and the angle of arrival, corresponding to a largest value of the metric; determine the payload and the phase noise of the packet transmitted over the channel for the selected combination of the frequency offset, the time offset and the angle of arrival; and remove a contribution of the recovered packet having the preamble, the payload and the phase noise, which is then transmitted over the selected combination of the frequency offset, the time offset and the angle of arrival from the received signal, wherein the received signal is updated for subsequent iterations. Wherein the processor is configured to: determine a single combination of the preamble with a most likely payload for each combination of the frequency offsets, the time offsets and the angles of arrival, to produce a dictionary matrix having only one atom for each combination of the frequency offsets, the time offsets and the angles of arrival, such that each atom represents a packet including the preamble and the payload determined for a corresponding combination of the frequency offsets, the time offsets and the angles of arrival, and transmitted over a channel having the corresponding combination of the frequency offsets, the time offsets and the angles of arrival; and determine a set of non-zero gains defining a set of atoms of the dictionary matrix, such that transmission of the atoms from the set of atoms with the corresponding non-zero gains approximates the received signal, wherein the processor jointly determines a phase noise of the packet corresponding to the combination of the frequency offsets, the time offsets and the angles of arrival, along with determining the most likely payload for each combination of the frequency offsets, the time offsets and the angles of arrival.

According to aspects of the present disclosure, the channel estimator iteratively determines the frequency offset, the time offset, the angle of arrival, the channel gain, a phase noise and the payload, for each packet, configuring the channel estimator for each iteration for: cross-correlating the received signal with each element of a dictionary matrix of the sparse recovery, such that each element of the dictionary matrix is an atom corresponding to a combination of the frequency offset, the time offset and the angle of arrival, selecting the combination of the frequency offset, the time offset and the angle of arrival, corresponding to a largest magnitude of the cross-correlating; determining the payload and the phase noise of the packet transmitted over the channel for the selected combination of the frequency offset, the time offset and the angle of arrival; performing a cyclic redundancy check (CRC) over the determined payload, if the CRC is accepted, based on a predetermined CRC polynomial, and then re-estimate the phase noise; and removing a contribution of the recovered packet having the preamble, the payload and the phase noise, which is then transmitted over the selected combination of the frequency offset, the time offset and the angle of arrival from the received signal, wherein the received signal is updated for subsequent iterations.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UNITS"). The teachings herein may be implemented in a 3GPP Long Term Evolution ("LTE") system, an Ultra-Mobile Broadband ("UMB") system, and other types of systems. LTE is a release of UNITS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1×RTT, 1×EV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A receiver in communication with a processor and a memory for decoding a set of packets asynchronously transmitted using a nominal carrier frequency over a common communication medium, comprising:
   a set of antennas to receive the set of packets asynchronously transmitted over the common communication medium;
   a channel estimator in communication with the processor, performs a sparse recovery in a three dimensional search domain defined by three axes including a frequency offset, a time offset and an angle of arrival, as well as estimates a channel gain corresponding to the transmission of each packet over a channel in the common communication medium, wherein the sparse recovery uses a dictionary matrix approximated with a combination of the preamble with a single payload for each combination of the frequency offsets, the time offsets and the angles of arrival; and
   a decoder in communication with the processor, to decode the payloads of the packets in the set of packets using the frequency offsets, the time offsets, the angles of arrival and the channel gains.

2. The receiver of claim 1, wherein the receiver includes a front end to produce a received signal including a combination of the set of packets modified with noise in the common communication medium, wherein each packet includes a preamble common for all packets in the set of packets and a payload unique for at least some packets in the set of packets, and wherein the channel estimator determines the frequency offset of the transmission of each packet from the nominal carrier frequency, the time offset of the transmission of each packet from a common point in time, the angle of arrival of the transmission of each packet, and the channel gain.

3. The receiver of claim 1, further comprising:
   a matched filter bank used by the channel estimator, to reduce a search area in the frequency offset, the time offset and the angle of arrival domains,
   wherein then, the sparse recovery uses a dictionary matrix approximated with a combination of the preamble with a single payload for each combination of the frequency offsets, the time offsets and the angles of arrival, in the reduced search area.

4. The receiver of claim 1, wherein the processor is configured to:
   determine a single combination of the preamble with a most likely payload for each combination of the frequency offsets, the time offsets and the angles of arrival, to produce a dictionary matrix having only one atom for each combination of the frequency offsets, the time offsets and the angles of arrival, such that each atom represents a packet including the preamble and the payload determined for a corresponding combination of the frequency offsets, the time offsets and the angles of arrival, and transmitted over a channel having the corresponding combination of the frequency offsets, the time offsets and the angles of arrival; and
   determine a set of non-zero gains defining a set of atoms of the dictionary matrix, such that transmission of the atoms from the set of atoms with the corresponding non-zero gains approximates the received signal.

5. The receiver of claim 4, wherein the processor jointly determines a phase noise of the packet corresponding to the combination of the frequency offsets, the time offsets and the angles of arrival, along with determining the most likely payload for each combination of the frequency offsets, the time offsets and the angles of arrival.

6. The receiver of claim 1, wherein the channel estimator iteratively determines the frequency offset, the time offset, the angle of arrival, the channel gain, a phase noise and the payload, for each packet, and
   wherein for each iteration, the channel estimator is configured to:
   cross-correlate the received signal with each element of a dictionary matrix of the sparse recovery, such that each element of the dictionary matrix is an atom corresponding to a combination of the frequency offset, the time offset and the angle of arrival;
   select the combination of the frequency offset, the time offset and the angle of arrival, corresponding to a largest magnitude of the cross-correlating;
   determine the payload and the phase noise of the packet transmitted over the channel for the selected combination of the frequency offset, the time offset and the angle of arrival; and
   remove a contribution of the recovered packet having the preamble, the payload and the phase noise, which is then transmitted over the selected combination of the frequency offset, the time offset and the angle of arrival from the received signal,
   wherein the received signal is updated for subsequent iterations.

7. The receiver of claim 1, wherein the channel estimator iteratively determines the frequency offset, the time offset, the angle of arrival, the channel gain, a phase noise and the payload, for each packet,
   wherein for each iteration, the channel estimator is configured to:
   cross-correlate the received signal with each element of a dictionary matrix of the sparse recovery, such that each element of the dictionary matrix is an atom corresponding to a combination of the frequency offset, the time offset and the angle of arrival, select the combination of the frequency offset, the time offset and the angle of arrival, corresponding to a largest magnitude of the cross-correlating;

determine the payload and the phase noise of the packet transmitted over the channel for the selected combination of the frequency offset, the time offset and the angle of arrival;

perform a cyclic redundancy check (CRC) over the determined payload, if the CRC is accepted, based on a predetermined CRC polynomial, and then re-estimate the phase noise; and remove a contribution of the recovered packet having the preamble, the payload and the phase noise, which is then transmitted over the selected combination of the frequency offset, the time offset and the angle of arrival from the received signal, wherein the received signal is updated for subsequent iterations.

8. The receiver of claim 6, wherein the channel gain is determined by a least squares fit (LS) between the received preamble of the packet recovered in that iteration, and the transmitted preamble with the determined frequency offset and the angle of arrival.

9. The receiver of claim 6, wherein the processor determines channel gains corresponding to the packets recovered up to the most recent iteration, wherein the transmission of those packets with those channel gains approximates the received signal.

10. The receiver of claim 6, wherein the processor applies a spatial filter prior to determining the payload and the phase noise, based on the determined angle of arrival and an expected arrival scenario, to filter the received signal, thereby reducing interference from other packets not yet recovered.

11. The receiver of claim 1, further comprising:
a cyclic redundancy check (CRC) routine, applied over the determined payload bits using a predefined CRC polynomial, that identifies if the detected payload bits are error-free, and if so, confirming the determined payload bits as the payload bits of a true packet.

12. The receiver of claim 1, further comprising:
classify, by the channel estimator, which candidate packets are indeed packets;
decode, by the decoder, the payloads either separately or jointly, using an estimation of the common communication media as defined by the frequency offsets, the time offsets, the angle of arrivals and the channel gains, of the remaining candidate packets.

13. A method for decoding a set of packets asynchronously transmitted on a nominal carrier frequency over a common communication medium, comprising:

receiving the set of packets asynchronously transmitted over the common communication medium using a set of antennas;

using a front end to produce a received signal including a combination of the set of packets modified with noise in the common communication medium, wherein each packet includes a preamble common for all packets in the set of packets and a payload unique for at least some packets in the set of packets;

determining, by a channel estimator in communication with a processor and a memory, using a sparse recovery, a frequency offset of the transmission of each packet from the carrier frequency, a time offset of the transmission of each packet from a common point in time, the angle of arrival of the transmission of each packet, as well as estimates a channel gain corresponding to the transmission of each packet over a channel in the common communication medium, wherein the sparse recovery uses a dictionary matrix approximated with a combination of the preamble with a single payload for each combination of the frequency offsets, the time offsets and the angles of arrival; and decoding, by a decoder in communication with the processor, the payloads of the packets in the set of packets using the frequency offsets, the time offsets, the angles of arrival and the channel gains.

14. The method of claim 13, wherein the channel estimator iteratively determines the frequency offset, the time offset, the angle of arrival, the channel gain, a phase noise and the payload, for each packet, and configuring the channel estimator for each iteration for:
cross-correlating the received signal with each element of a dictionary matrix of the sparse recovery, such that each element of the dictionary matrix is an atom corresponding to a combination of the frequency offset, the time offset and the angle of arrival;

selecting the combination of the frequency offset, the time offset and the angle of arrival, corresponding to a largest magnitude of the cross-correlating;

determining the payload and the phase noise of the packet transmitted over the channel for the selected combination of the frequency offset, the time offset and the angle of arrival; and removing a contribution of the recovered packet having the preamble, the payload and the phase noise, which is then transmitted over the selected combination of the frequency offset, the time offset and the angle of arrival from the received signal, wherein the received signal is updated for subsequent iterations.

15. The method of claim 13, wherein the channel estimator iteratively determines the frequency offset, the time offset, the angle of arrival, the channel gain, a phase noise and the payload, for each packet, and wherein for each iteration, the channel estimator is configured to:
determine a magnitude of a difference between the received signal and each packet corresponding to each element of the dictionary matrix to obtain a metric for each element of the dictionary matrix, such that each element of the dictionary matrix is an atom corresponding to a combination of the frequency offset, the time offset and the angle of arrival;

select the combination of the frequency offset, the time offset and the angle of arrival, corresponding to a largest value of the metric;

determine the payload and the phase noise of the packet transmitted over the channel for the selected combination of the frequency offset, the time offset and the angle of arrival; and remove a contribution of the recovered packet having the preamble, the payload and the phase noise, which is then transmitted over the selected combination of the frequency offset, the time offset and the angle of arrival from the received signal, wherein the received signal is updated for subsequent iterations.

16. The method of claim 13, wherein the processor is configured to:
determine a single combination of the preamble with a most likely payload for each combination of the frequency offsets, the time offsets and the angles of arrival, to produce a dictionary matrix having only one atom for each combination of the frequency offsets, the time offsets and the angles of arrival, such that each atom represents a packet including the preamble and the payload determined for a corresponding combination of the frequency offsets, the time offsets and the angles of arrival, and transmitted over a channel having the corresponding combination of the frequency offsets, the time offsets and the angles of arrival; and determine a set of non-zero gains defining a set of atoms of the dictionary matrix, such that transmission of the atoms from the set of atoms with the corresponding non-zero gains approximates the received signal, wherein the processor jointly determines a phase noise of the packet corresponding to the combination of the frequency offsets, the time offsets and the angles of arrival, along with determining the most likely payload for each combination of the frequency offsets, the time offsets and the angles of arrival.

17. A non-transitory computer readable storage medium embodied thereon a program executable by a computer for performing a method, the method for decoding a set of packets asynchronously transmitted on a nominal carrier frequency over a common communication medium, comprising:

receiving the set of packets asynchronously transmitted over the common communication medium using a set of antennas;

determining, by a channel estimator including a processor and a memory, using a sparse recovery, a frequency offset of the transmission of each packet from the carrier frequency, a time offset of the transmission of each packet from a common point in time, the angle of arrival of the transmission of each packet, as well as estimates a channel gain corresponding to the transmission of each packet over a channel in the common communication medium, wherein the sparse recovery uses a dictionary matrix approximated with a combination of the preamble with a single payload for each combination of the frequency offsets, the time offsets and the angles of arrival; and decoding, by a decoder, the payloads of the packets in the set of packets using the frequency offsets, the time offsets, the angles of arrival and the channel gains.

18. The method of claim 17, wherein the channel estimator iteratively determines the frequency offset, the time offset, the angle of arrival, the channel gain, a phase noise and the payload, for each packet, configuring the channel estimator for each iteration for:

cross-correlating the received signal with each element of a dictionary matrix of the sparse recovery, such that each element of the dictionary matrix is an atom corresponding to a combination of the frequency offset, the time offset and the angle of arrival, selecting the combination of the frequency offset, the time offset and the angle of arrival, corresponding to a largest magnitude of the cross-correlating;

determining the payload and the phase noise of the packet transmitted over the channel for the selected combination of the frequency offset, the time offset and the angle of arrival;

performing a cyclic redundancy check (CRC) over the determined payload, if the CRC is accepted, based on a predetermined CRC polynomial, and then re-estimate the phase noise; and removing a contribution of the recovered packet having the preamble, the payload and the phase noise, which is then transmitted over the selected combination of the frequency offset, the time offset and the angle of arrival from the received signal, wherein the received signal is updated for subsequent iterations.

* * * * *